(12) United States Patent
Ishizaki et al.

(10) Patent No.: US 10,670,903 B2
(45) Date of Patent: Jun. 2, 2020

(54) DISPLAY DEVICE

(71) Applicant: Japan Display Inc., Tokyo (JP)

(72) Inventors: Koji Ishizaki, Tokyo (JP); Hayato Kurasawa, Tokyo (JP); Masanobu Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 79 days.

(21) Appl. No.: 15/938,622

(22) Filed: Mar. 28, 2018

(65) Prior Publication Data

US 2018/0284513 A1    Oct. 4, 2018

(30) Foreign Application Priority Data

Mar. 31, 2017  (JP) ................. 2017-071575

(51) Int. Cl.
| | | |
|---|---|---|
| G02F 1/1333 | (2006.01) | |
| G02F 1/1345 | (2006.01) | |
| G06F 3/041 | (2006.01) | |
| G06F 3/044 | (2006.01) | |
| G02F 1/1339 | (2006.01) | |

(52) U.S. Cl.
CPC ...... *G02F 1/13338* (2013.01); *G02F 1/13452* (2013.01); *G02F 1/13458* (2013.01); *G06F 3/044* (2013.01); *G02F 1/1339* (2013.01); *G02F 1/1345* (2013.01); *G02F 1/13394* (2013.01); *G02F 2001/13456* (2013.01); *G02F 2201/56* (2013.01); *G02F 2202/28* (2013.01); *G06F 3/0416* (2013.01); *G06F 3/0443* (2019.05); *G06F 3/04164* (2019.05)

(58) Field of Classification Search
CPC ............. G02F 1/13338; G02F 1/13452; G02F 1/13458; G02F 1/1345; G02F 1/13394; G02F 1/1339; G02F 2001/13456; G02F 2201/56; G06F 3/044; G06F 3/0443; G06F 3/0416; G06F 3/04164
See application file for complete search history.

(56) References Cited

U.S. PATENT DOCUMENTS

| | | | | |
|---|---|---|---|---|
| 2012/0206396 A1* | 8/2012 | Kitabayashi | .......... | G06F 3/0412 345/173 |
| 2012/0223913 A1* | 9/2012 | Kim | ................ | G06F 3/044 345/174 |
| 2014/0139771 A1* | 5/2014 | Choi | ................ | G09G 3/20 349/43 |
| 2015/0371076 A1* | 12/2015 | Lee | ................ | G06F 3/041 382/124 |

FOREIGN PATENT DOCUMENTS

JP     2012-138017 A     7/2012

* cited by examiner

*Primary Examiner* — Angela K Davison
(74) *Attorney, Agent, or Firm* — K&L Gates LLP

(57) ABSTRACT

According to one embodiment, a display device comprises a first substrate includes a first area, a second area adjacent to the first area, and a first terminal portion located in the first area, and a second substrate includes an edge including a linear portion located between the first area and the second area, the second substrate overlapping the second area, wherein the second substrate further comprises a protruding portion protruding than the linear portion and a second terminal portion located in the protruding portion, and the display device further comprises a holding layer holding a gap between the second area and the protruding portion.

16 Claims, 26 Drawing Sheets

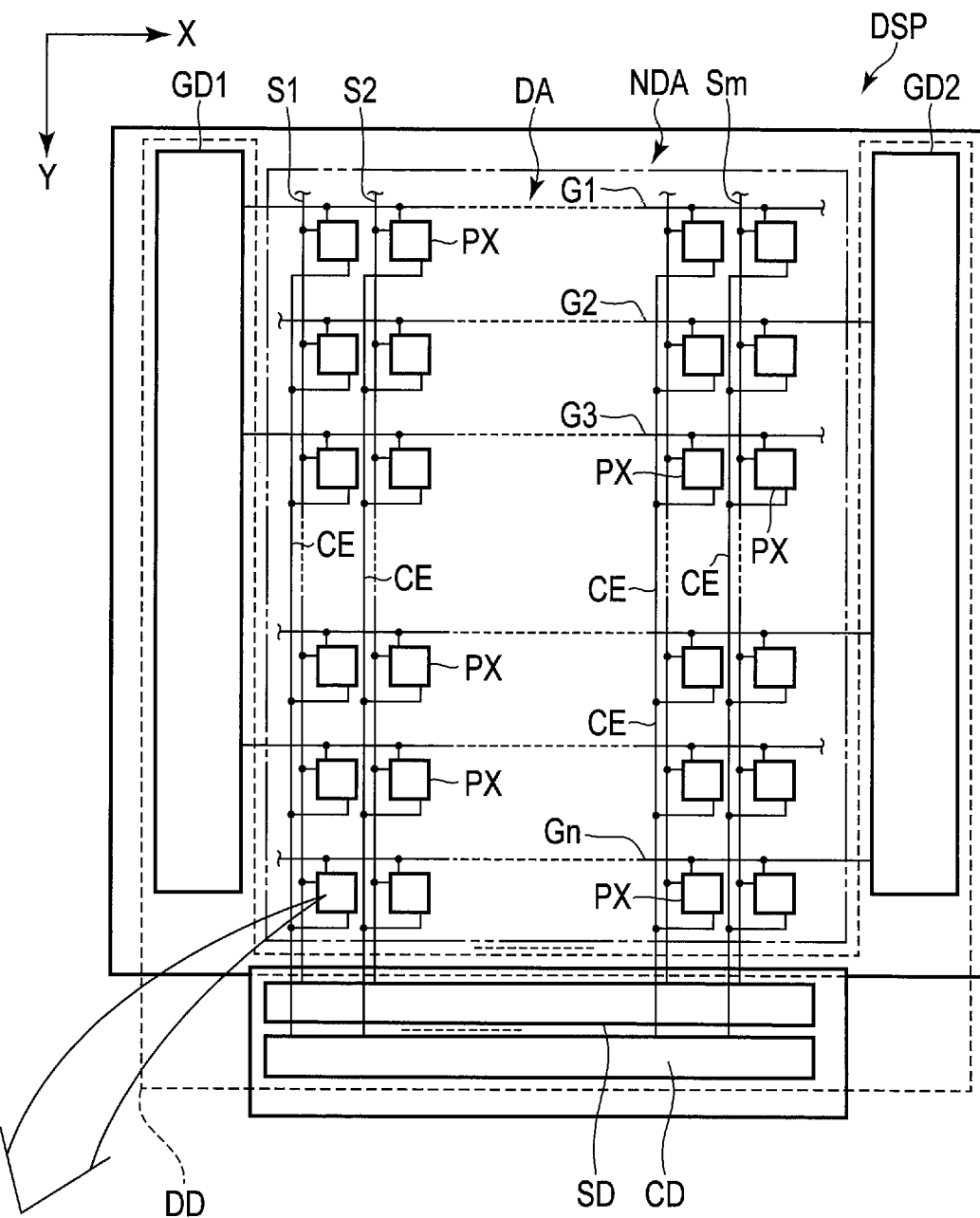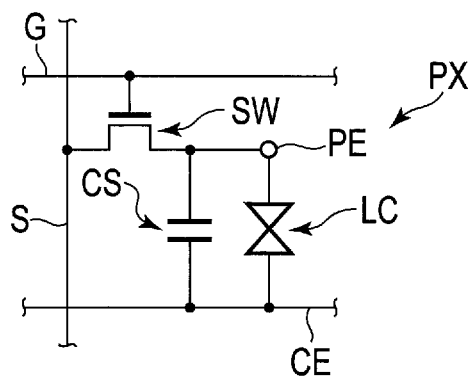
FIG. 3

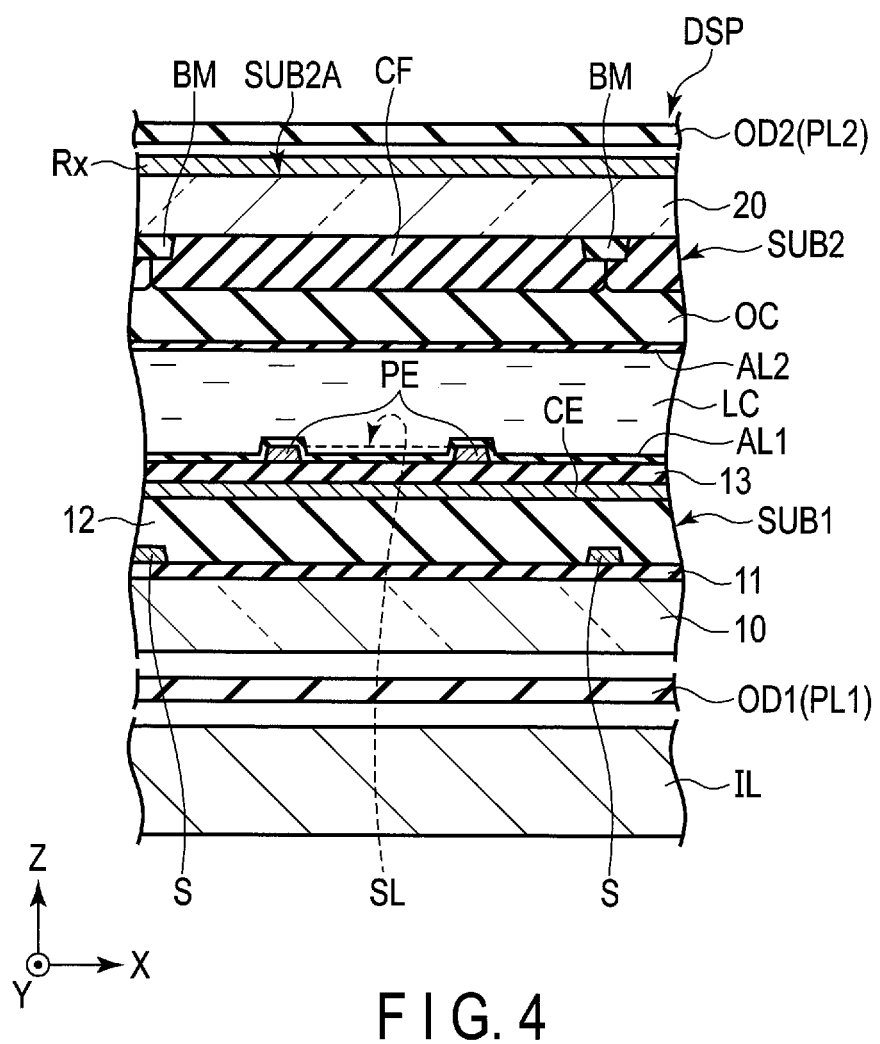
F I G. 4

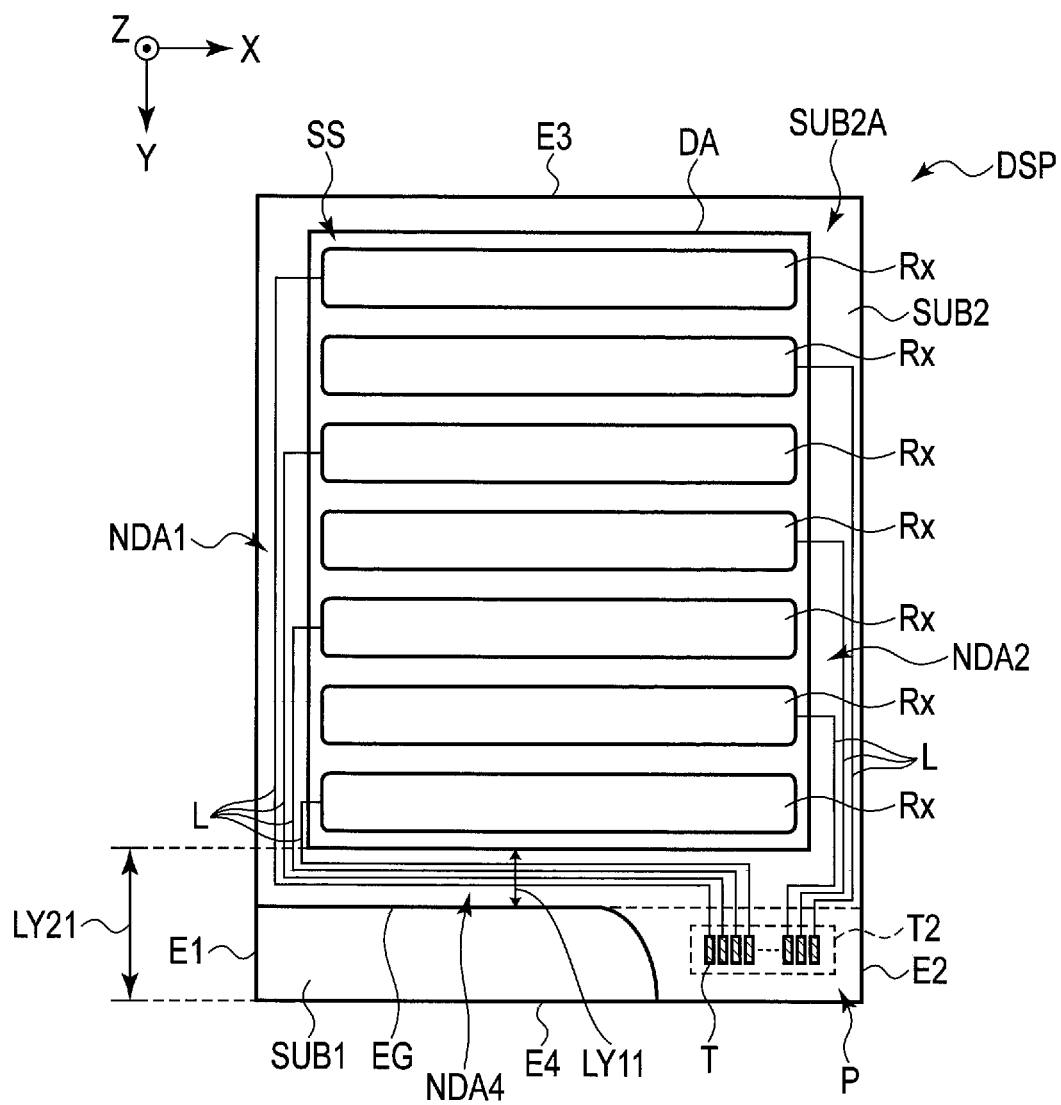
F I G. 6

<Comparative example>

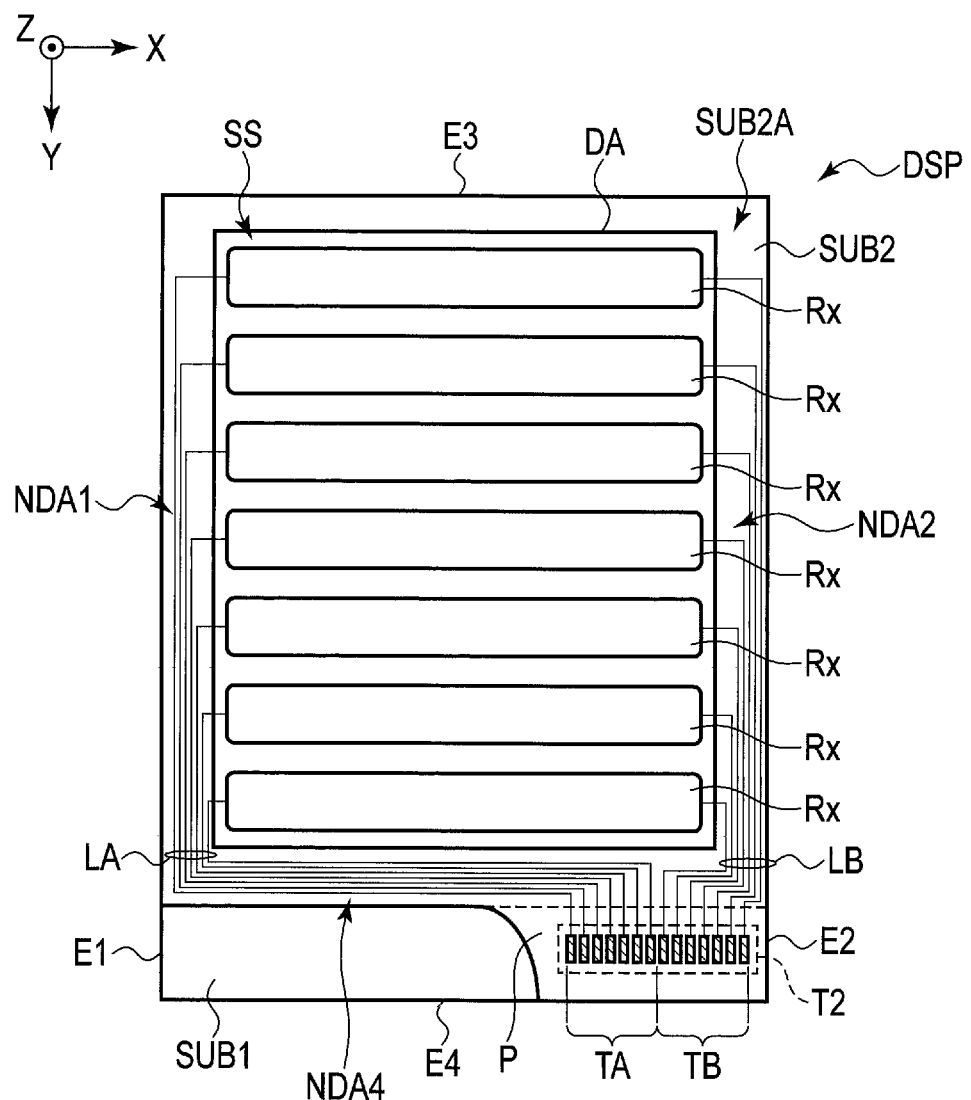
F I G. 8

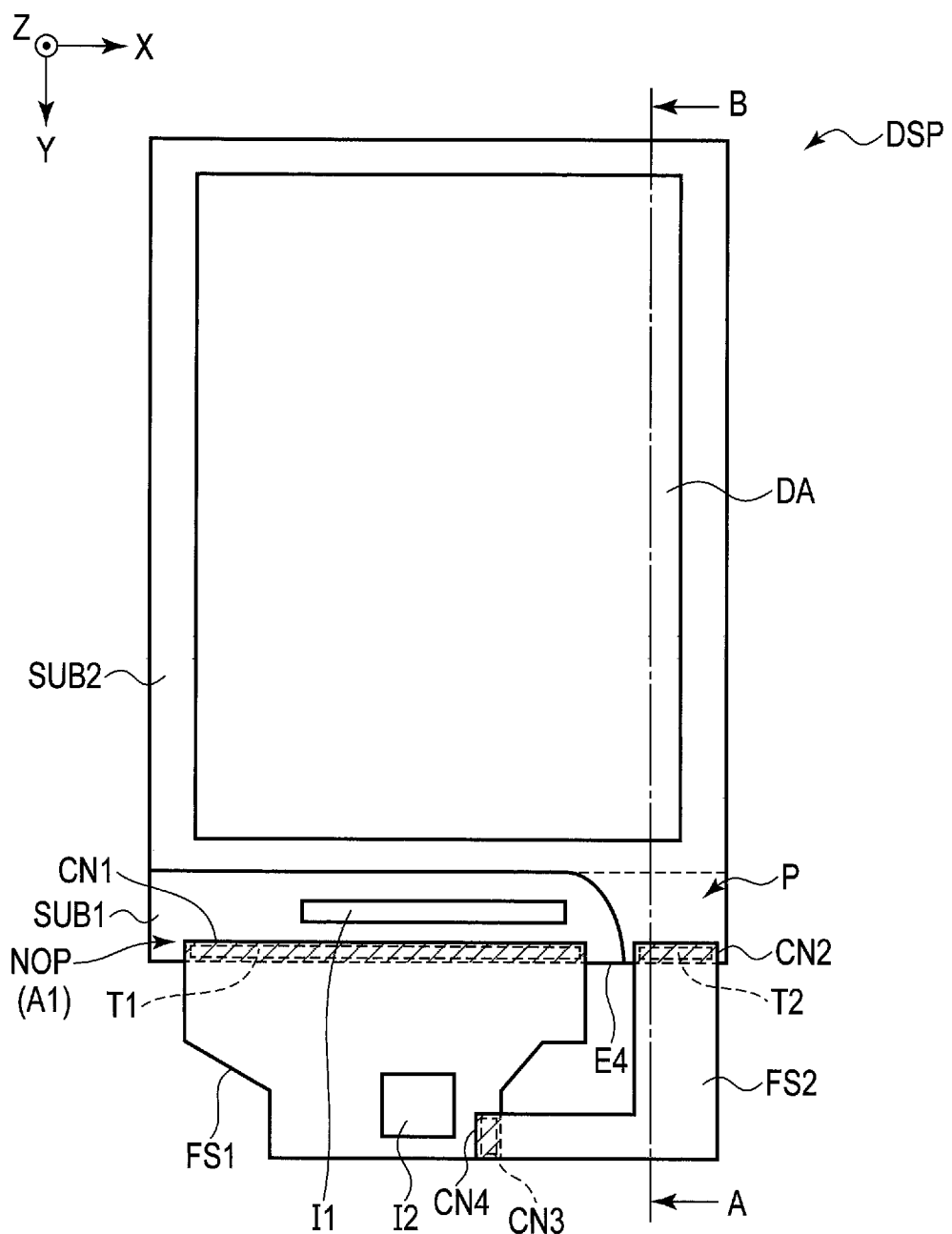
F I G. 10

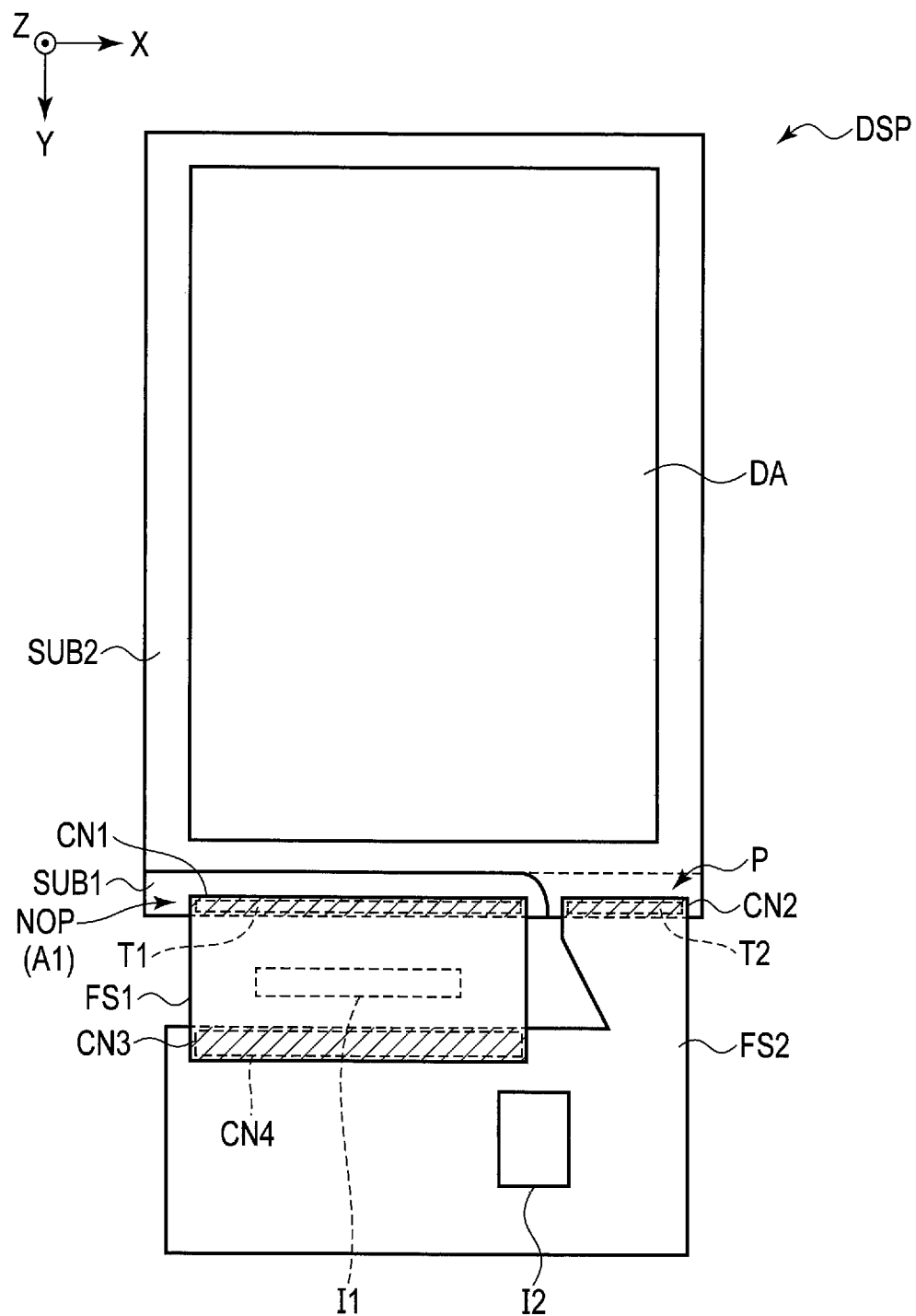
F I G. 11

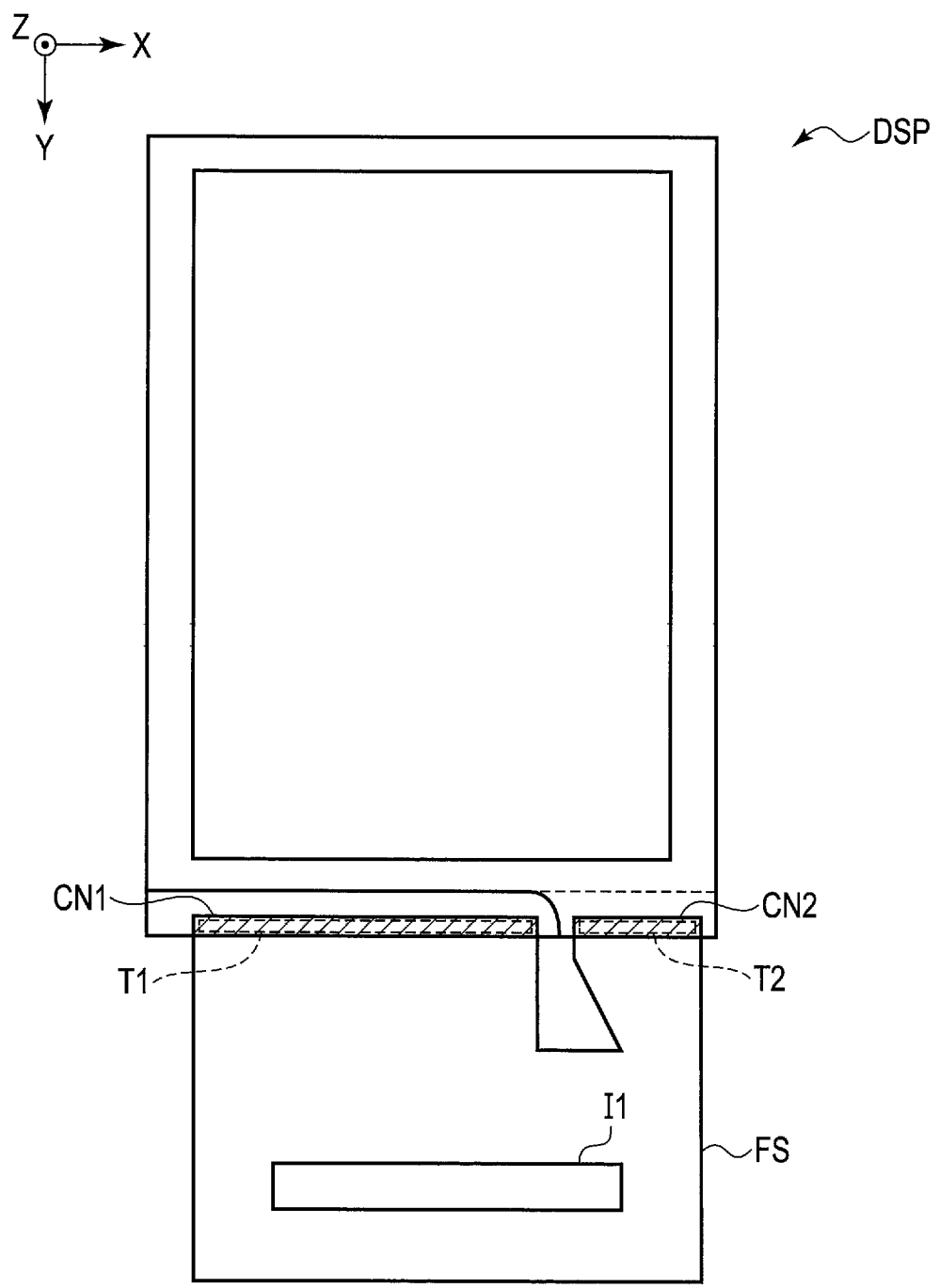
F I G. 12

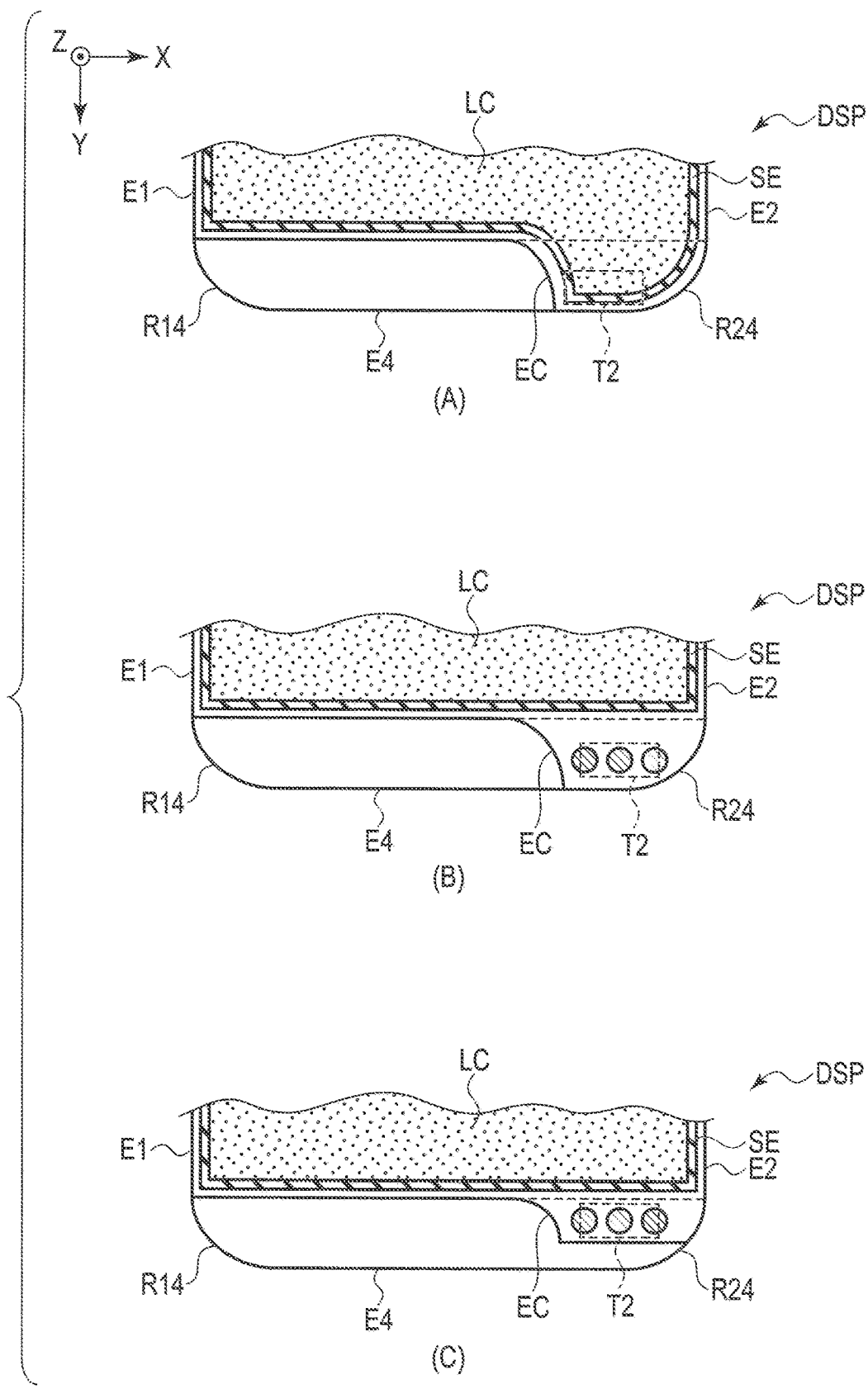
F I G. 17

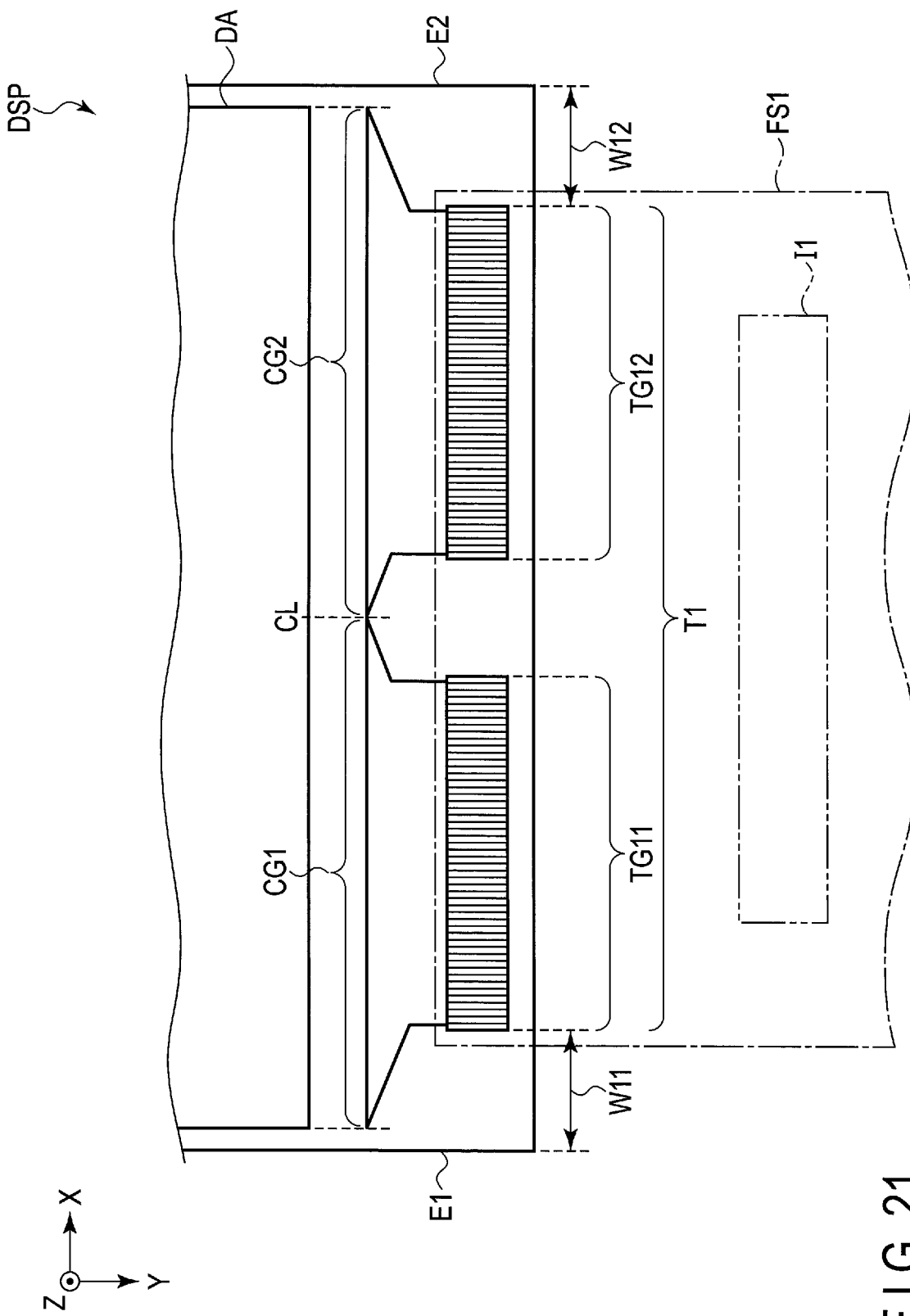
F I G. 21

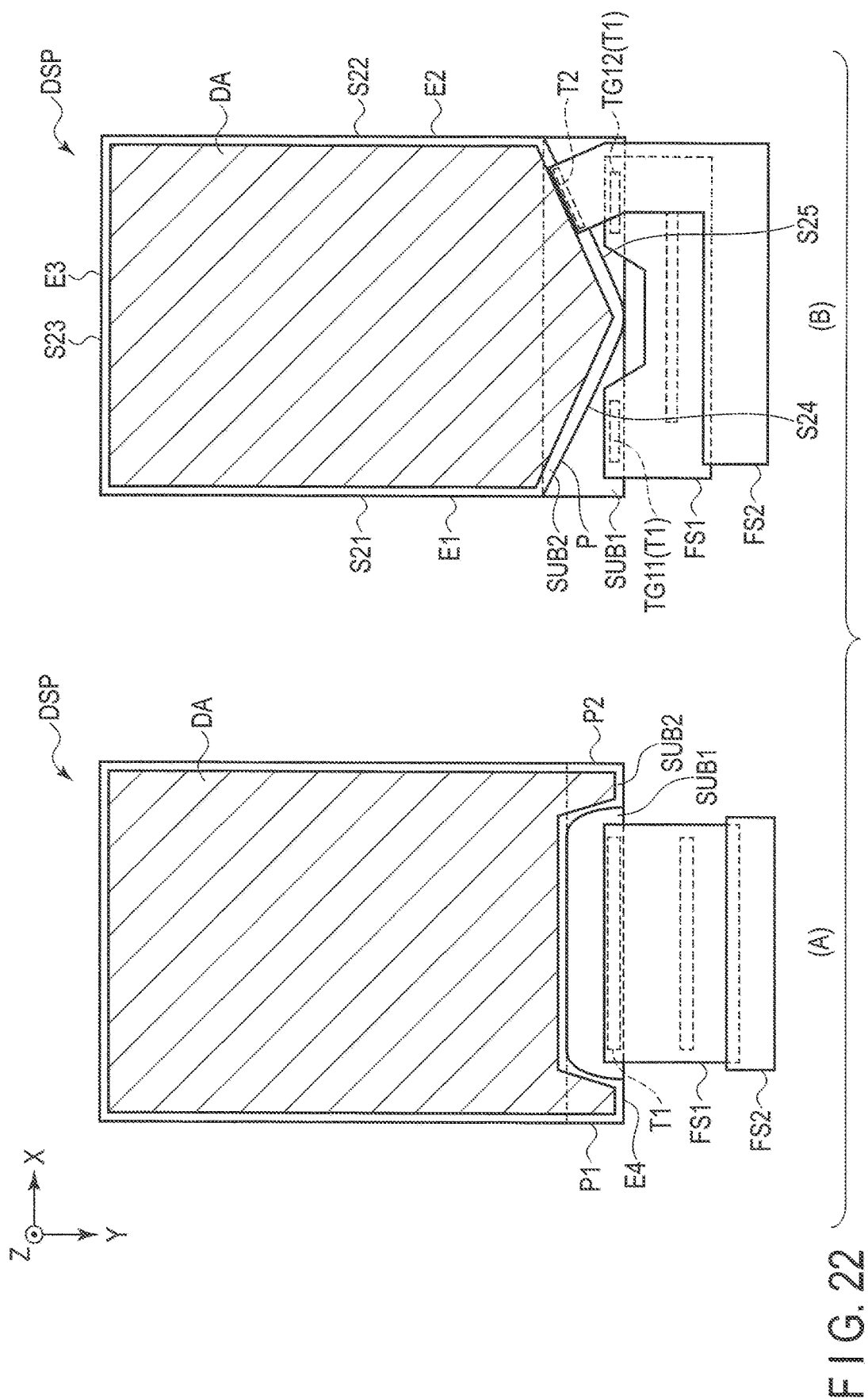
F I G. 22

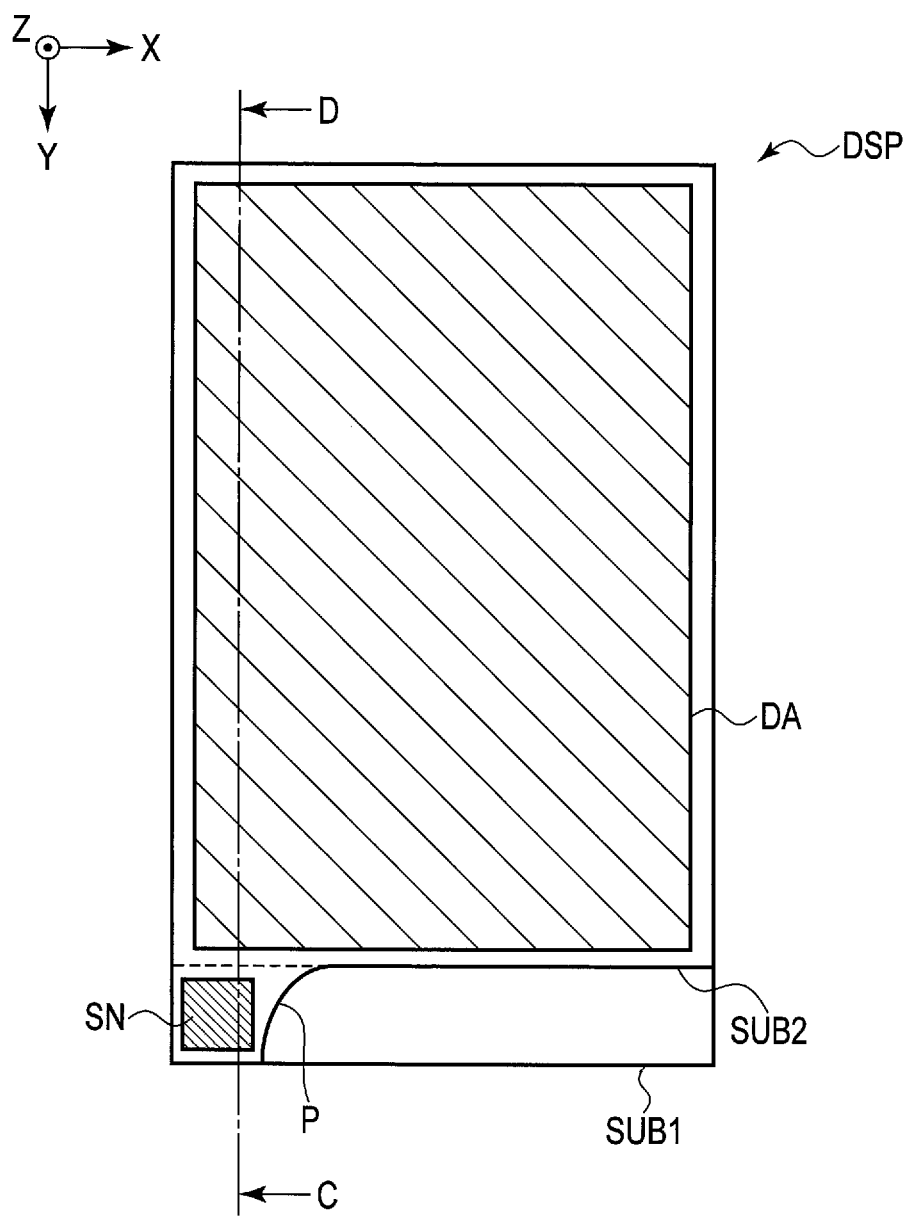
F I G. 23

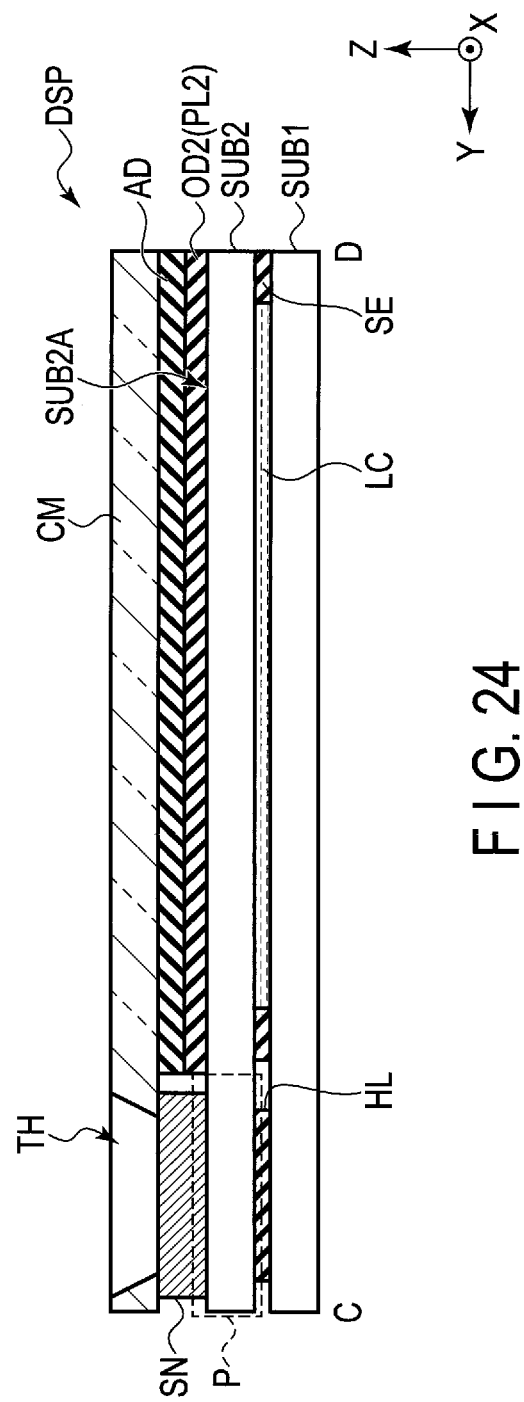
F I G. 24

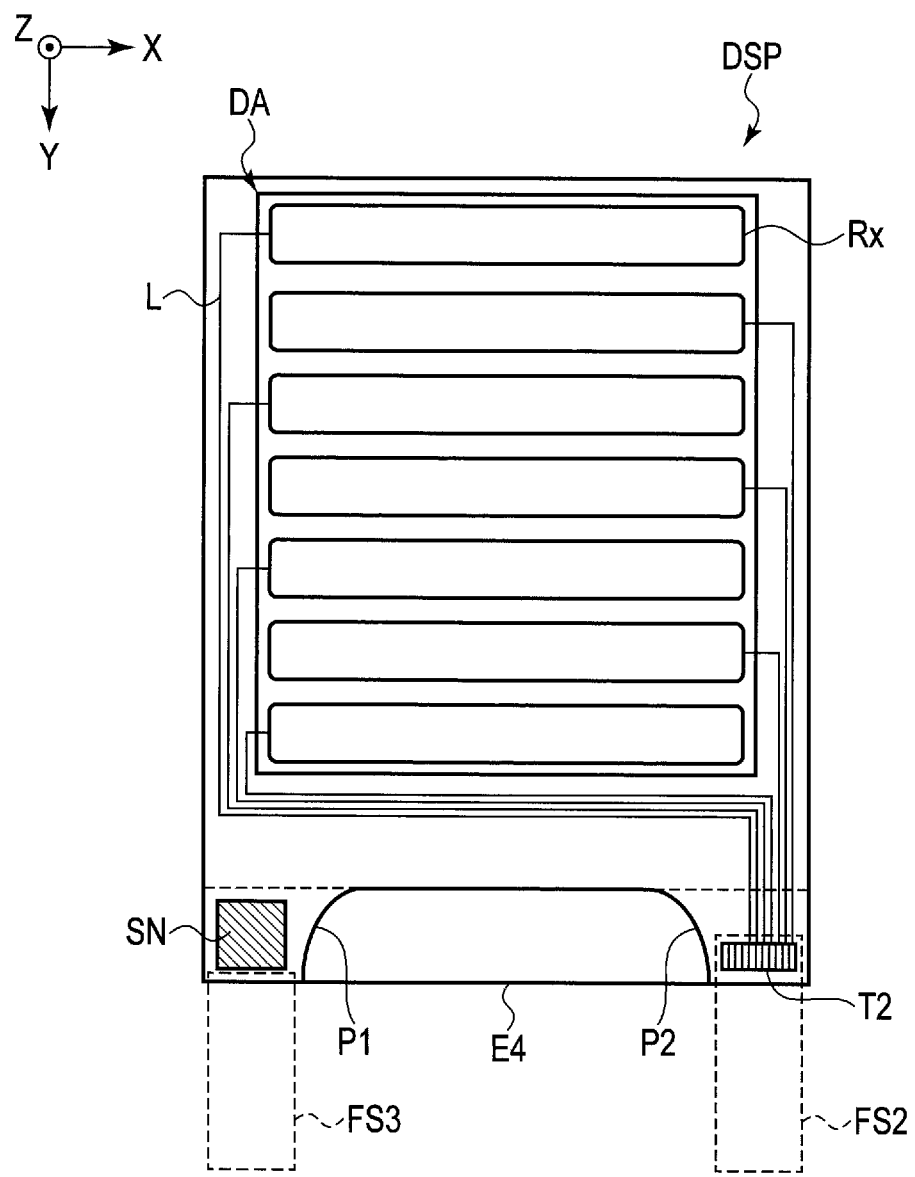
F I G. 26

DISPLAY DEVICE

CROSS-REFERENCE TO RELATED APPLICATIONS

This application is based upon and claims the benefit of priority from Japanese Patent Application No. 2017-071575, filed Mar. 31, 2017, the entire contents of which are incorporated herein by reference.

FIELD

Embodiments described herein relate generally to a display device.

BACKGROUND

In recent years, sensors capable of detecting contact or approach of an object such as a finger have been put into practical use as display device interfaces or the like. As an example of such sensors, a capacitive touch panel comprises an electrode which detects variation in electrostatic capacitance caused by the contact of the object. For example, a touch panel formed by bonding a first transparent substrate in which a first transparent electrode and a first connection terminal are disposed on an upper surface of a first resin film and a second transparent substrate in which a second transparent electrode and a second connection terminal are disposed on an upper surface of a second resin film, by an adhesive layer, has been proposed. The first transparent substrate is disposed on the second transparent substrate and includes a notch which exposed the second connection terminal. The first connection terminal and the second connection terminal are thereby connected to a single flexible substrate.

Incidentally, for example, not only a flexible substrate necessary to control a display panel, but also a flexible substrate necessary to control the touch panel are required for a sensor-equipped display device. Narrowing the frame may be prevented due to restrictions for disposing these two flexible substrates.

SUMMARY

The present disclosure generally relates to a display device.

According to one embodiment, a display device includes a first substrate includes a first area, a second area adjacent to the first area, and a first terminal portion located in the first area, and a second substrate includes an edge including a linear portion located between the first area and the second area, the second substrate overlapping the second area, wherein the second substrate further comprises a protruding portion protruding than the linear portion and a second terminal portion located in the protruding portion, and the display device further comprises a holding layer holding a gap between the second area and the protruding portion.

BRIEF DESCRIPTION OF THE DRAWINGS

FIG. 3 is a diagram showing a basic configuration and an equivalent circuit, of the display device DSP shown in FIG. 1.

FIG. 4 is a cross-sectional view showing a structure of several parts of the display device DSP shown in FIG. 3.

FIG. 6 is a plan view showing a configuration example of a display device DSP comprising the sensor SS.

FIG. 8 is a plan view showing the other configuration example of the display device DSP comprising the sensor SS.

FIG. 10 is a diagram showing a configuration example of the display device DSP comprising a first flexible substrate FS1 and a second flexible substrate FS2.

FIG. 11 is a diagram showing the other configuration example of the display device DSP comprising the first flexible substrate FS1 and the second flexible substrate FS2.

FIG. 12 is a diagram showing the other configuration example of the display device DSP comprising a single flexible substrate FS.

FIG. 17 is a plan view showing the other example applied to the display device DSP according to the embodiments.

FIG. 21 is a diagram showing the other example of the layout of the first terminal portion T1.

FIG. 22 is a plan view showing a modified example of the embodiments.

FIG. 23 is a plan view showing a third modified example of the embodiments.

FIG. 24 is a cross-sectional view showing the display device DSP comprising a sensor SN cut along line C-D in FIG. 23.

FIG. 26 is a plan view showing the other connection structure example of the sensor SN and the second flexible substrate FS2.

DETAILED DESCRIPTION

In general, according to one embodiment, a display device comprises a first substrate comprising a first area, a second area adjacent to the first area, and a first terminal portion located in the first area, and a second substrate comprising an edge including a linear portion located between the first area and the second area, the second substrate overlapping the second area, wherein the second substrate further comprises a protruding portion protruding than the linear portion and a second terminal portion located in the protruding portion, and the display device further comprises a holding layer holding a gap between the second area and the protruding portion.

According to another embodiment, a display device comprises a first substrate comprising a first terminal portion, a second substrate comprising a second terminal portion, an overlap portion at which the first substrate and the second substrate overlap, and a non-overlap portion at which the first substrate and the second substrate do not overlap, wherein the overlap portion comprises a display portion and a frame portion, the first terminal portion is located in the non-overlap portion, and the second terminal portion is located in the frame portion.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like, of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

Figure 1:
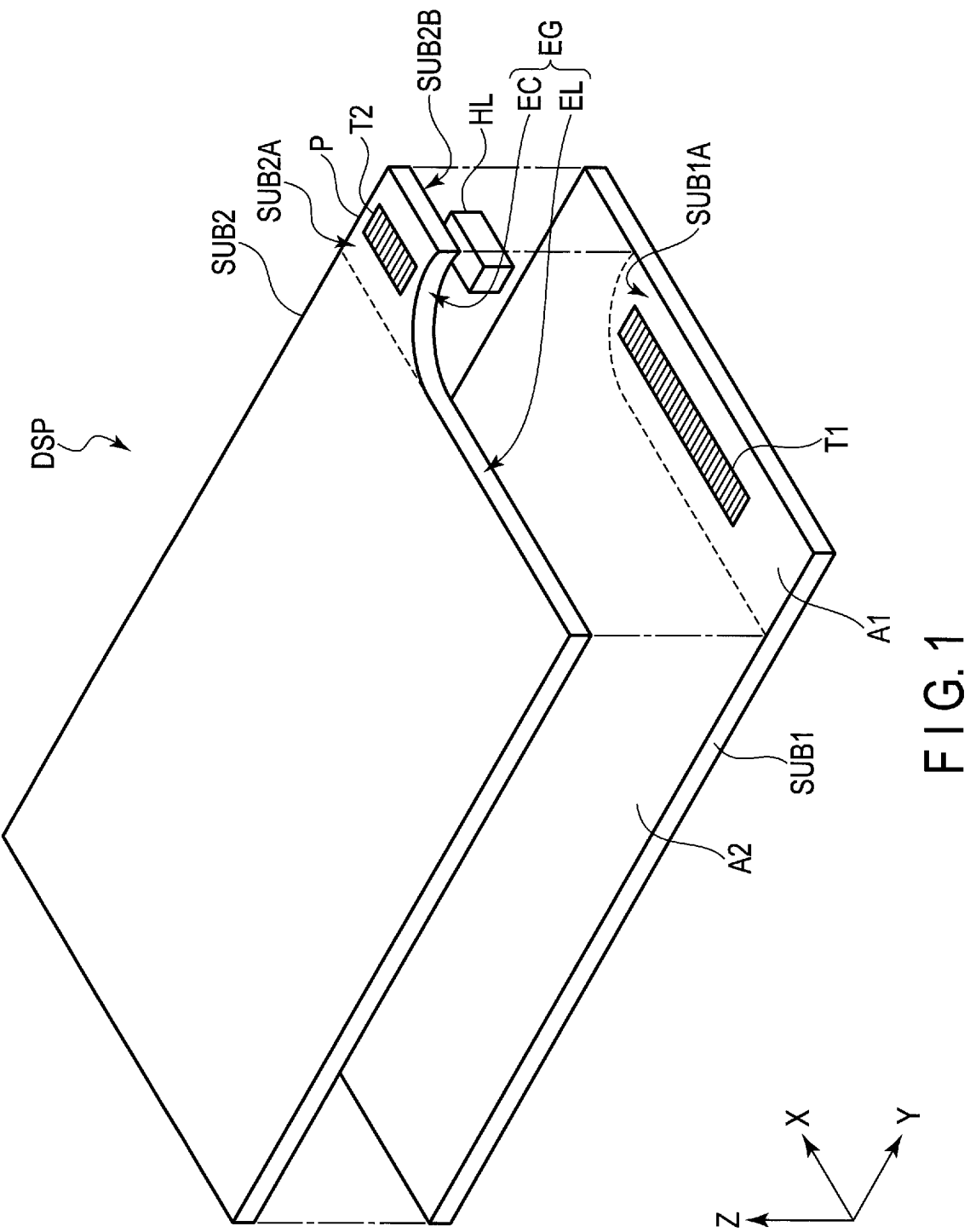
FIG. 1 is an exploded perspective view showing a configuration example of a display device DSP according to the embodiments.

FIG. 1 is an exploded perspective view showing a configuration example of a display device DSP according to the embodiments. In the drawing, a first direction X and a second direction Y intersect each other, and a third direction Z intersects the first direction X and the second direction Y. For example, the first direction X, the second direction Y, and the third direction Z are orthogonal to each other but may intersect at an angle other than 90 degrees. In the present specification, an observation position at which the display device DSP is observed is assumed to be located on a tip side of an arrow indicating the third direction Z, and viewing from the observation position toward the X-Y plane defined by the first direction X and the second direction Y is called a planar view.

In the embodiments, a liquid crystal display device will be explained as an example of the display device. The major configuration explained in the present embodiment can also be applied to a self-luminous display device comprising an organic electroluminescent display element, and the like, an electronic paper display device comprising an electrophoretic element, and the like, a display device employing micro-electromechanical systems (MEMS), or a display device employing electrochromism.

FIG. 1 shows the only major portions of the display device DSP. The display device DSP comprises a first substrate SUB1 and a second substrate SUB2. The first substrate SUB1 includes a first area A1, a second area A2 adjacent to the first area A1, and a first terminal portion T1 located in the first area A1. The first substrate SUB1 includes a first upper surface SUB1A facing the second substrate SUB2. The first terminal portion T1 is provided on the first upper surface SUB1A. In the example illustrated, the first area A1 is an area extending in the first direction X, and the first terminal portion T1 comprises a plurality of terminals arranged in the first direction X as explained later in detail.

The second substrate SUB2 includes an edge EG located between the first area A1 and the second area A2, and overlaps the second area A2 through a gap in the third direction Z. In other words, the edge EG makes a boundary between the first area A1 and the second area A2. In the present specification, "overlap" indicates not only a case where two members overlap in a state of being in contact with each other, but also a case where in planar view, two members overlap while spaced apart from each other with an air layer or the other member interposed between the members. The edge EG includes a linear portion EL extending in the first direction X. The second substrate SUB2 includes a protruding portion P which protrudes more than the linear portion EL in the second direction Y, and a second terminal portion T2 located in the protruding portion P. The second substrate SUB2 includes a second upper surface SUB2A and a second lower surface SUB2B facing the first substrate SUB1. The second terminal portion T2 is provided on the second upper surface SUB2A. In the example illustrated, the edge EG includes a curved portion EC connected to the linear portion EL. The protruding portion P includes the curved portion EC. The second terminal portion T2 comprises a plurality of terminals arranged in the first direction X as explained later in detail. If the first substrate SUB1 is defined in a state in which the second substrate SUB2 and the first substrate SUB1 overlap, an area of the first substrate SUB1 which overlaps the second substrate SUB2 corresponds to the second area A2 and an area which does not overlap the second substrate SUB2 corresponds to the first area A1. In other words, an area of the first substrate SUB1 which the protruding portion P of the second substrate SUB2 overlaps also corresponds to the second area A2.

The protruding portion P overlap the second area A2 via a gap in the third direction Z. A holding layer HL which holds the gap is provided between the second area A2 and the protruding portion P. For example, the holding layer HL is an adhesive layer bonding the first substrate SUB1 and the second substrate SUB2, a resin layer formed on at least one of the first substrate SUB1 and the second substrate SUB2, beads, or the like. The shape of the holding layer HL is not particularly limited. The holding layer HL should desirably be located directly under the second terminal portion T2 from the viewpoint of suppressing the deformation of the second substrate SUB2 when a flexible substrate is crimped on the second terminal portion T2 later.

Figure 2:
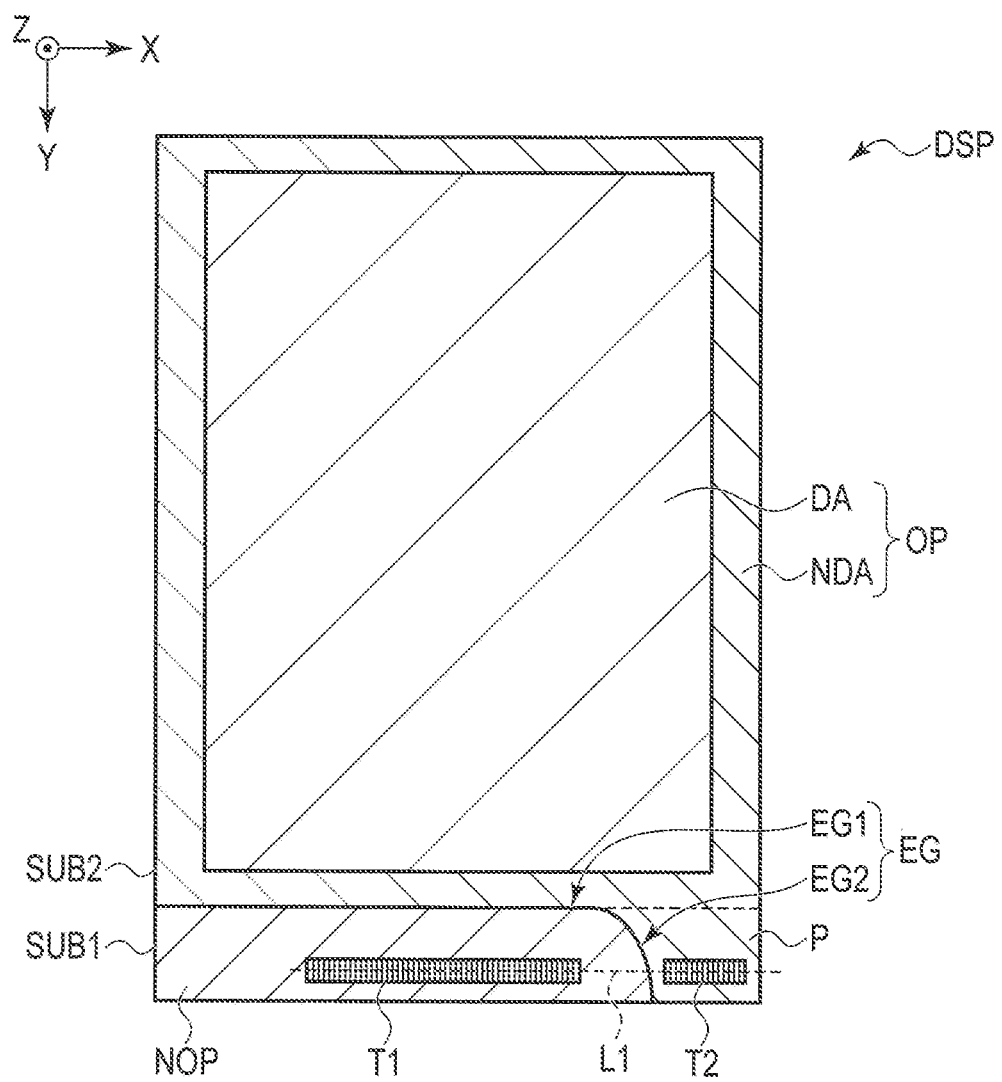
FIG. 2 is a plan view showing the display device DSP shown in FIG. 1.

FIG. 2 is a plan view showing the display device DSP shown in FIG. 1. The display device DSP comprises an overlap portion OP where the first substrate SUB1 and the second substrate SUB2 overlap, and a non-overlap portion NOP where the first substrate SUB1 and the second substrate SUB2 do not overlap. The overlap portion OP comprises a display portion DA which displays an image and a frame portion NDA which surrounds the display portion DA. The non-overlap portion NOP is a part of the first substrate SUB1 and corresponds to the first area A1 shown in FIG. 1. The first terminal portion T1 is located at the non-overlap portion NOP. The second terminal portion T2 is located at the frame portion NDA. The protruding portion P at which the second terminal portion T2 is disposed is included in the frame portion NDA in the example illustrated. The non-overlap portion NOP of the first substrate SUB1 and the protruding portion P of the second substrate SUB2 are aligned in the first direction X. The non-overlap portion NOP and the display portion DA are aligned in the second direction Y. The non-overlap portion NOP and the protruding portion P are aligned in the second direction Y.

The edge EG of the second substrate SUB2 includes a first portion EG1 located between the display portion DA and the first terminal portion T1, and a second portion EG2 located between the first terminal portion T1 and the second terminal portion T2, in planar view. The first portion EG1 extends in the first direction X and corresponds to the above-explained linear portion EL. The second portion EG2 is connected to the first portion EG1 and extends in a direction different from the first direction X. For example, the second portion EG2 corresponds to the curved portion EC but may be a linear portion extending in a direction different from the first direction X.

The protruding portion P corresponds to a portion which protrudes than the first portion EG1 in the second direction Y, and includes the second portion EG2.

The first terminal portion T1 located at the non-overlap portion NOP and the second terminal portion T2 located at the protruding portion P are located on a straight line L1 extending in the first direction X, in planar view.

FIG. 3 is a diagram showing a basic configuration and an equivalent circuit, of the display device DSP shown in FIG. 1. The display device DSP comprises pixels PX, scanning lines G (G1 to Gn), signal lines S (S1 to Sm), common electrodes CE and the like, in the display portion DA. The pixels PX are arranged in the first direction X and the second direction Y. The scanning lines G extend in the first direction X so as to be arranged in the second direction Y. The signal lines S extend in the second direction Y so as to be arranged in the first direction X. The common electrode CE is disposed over the pixels PX.

A display driver DD includes at least several parts of a signal line driver SD, scanning line drivers GD1 and GD2, and a common electrode driver CD. The odd-numbered scanning lines G are connected to the scanning line driver GD1 while the even-numbered scanning lines G are connected to the scanning line driver GD2. The signal lines S are connected to the signal line driver SD. The common electrodes CE are connected to the common electrode driver CD.

Each of the pixels PX comprises a switching element SW, a pixel electrode PE, the common electrode CE, a liquid crystal layer LC and the like. The switching element SW is electrically connected to the scanning line G and the signal line S. The pixel electrode PE is electrically connected to the switching element SW. The pixel electrode PE is opposed to the common electrode CE, and drives the liquid crystal layer LC by an electric field formed between the pixel electrode PE and the common electrode CE. A storage capacitor CS is formed, for example, between the common electrode CE and the pixel electrode PE.

FIG. 4 is a cross-sectional view showing a structure of several parts of the display device DSP shown in FIG. 3. In the example illustrated, the display device DSP is configured to correspond to the display mode mainly using the lateral electric field approximately parallel to a main surface of the substrate. The configuration of the display device DSP is not limited to the example illustrated. The display device DSP may be configured to correspond to a display mode using a vertical electric field perpendicular to the main surface, an oblique electric field inclined to the main surface or a combination of the electric fields. The main surface is a surface parallel to an X-Y plane.

The first substrate SUB1 includes a first insulating substrate 10, a signal line S, a common electrode CE, a pixel electrodes PE, a first insulating film 11, a second insulating film 12, a third insulating film 13, a first alignment film AL1, and the like. It should be noted that switching element, scanning line, various insulating films interposed between the switching element and scanning line, and the like are not illustrated in the drawing. The first insulating substrate 10 is a substrate having a light transmitting property such as a glass substrate or a resin substrate.

The second substrate SUB2 includes a second insulating substrate 20, a light-shielding layer BM, a color filter CF, an overcoat layer OC, a second alignment film AL2, and the like. The color filter CF may be disposed on the first substrate SUB1.

The liquid crystal layer LC is located between the first substrate SUB1 and second substrate SUB2 and held between the first alignment film AL1 and the second alignment film AL2.

A sensor built in the display device DSP of the present embodiment comprises a detection electrode Rx. In the example illustrated, the detection electrode Rx is located on the second upper surface SUB2A of the second substrate SUB2. The detection electrode Rx is formed of a single metallic material, a plurality of metallic materials, an alloy containing a combination of the metallic materials, a transparent oxide material such as ITO or IZO, a conductive organic material, a dispersing member of a fine conductive material, and the like. The detection electrode Rx may have a single-layer structure or a multi-layer structure formed by stacking a plurality of thin films. The shape of the detection electrode Rx is, for example, a strip shape, a wave shape, a grating shape, a mesh shape, and the like.

A first optical element OD1 including a first polarizer PL1 is located between the first insulating substrate 10 and an illumination device IL. A second optical element OD2 including a second polarizer PL2 is located on the detection electrode Rx.

Next, a configuration example of a sensor SS built in the display device DSP of the embodiments will be explained. The sensor SS hereinafter explained is, for example, a capacitive sensor, which detects contact or approach of the object to the display device DSP, based on the variation in electrostatic capacitance between a pair of electrodes on opposite sides of a dielectric.

Figure 5:
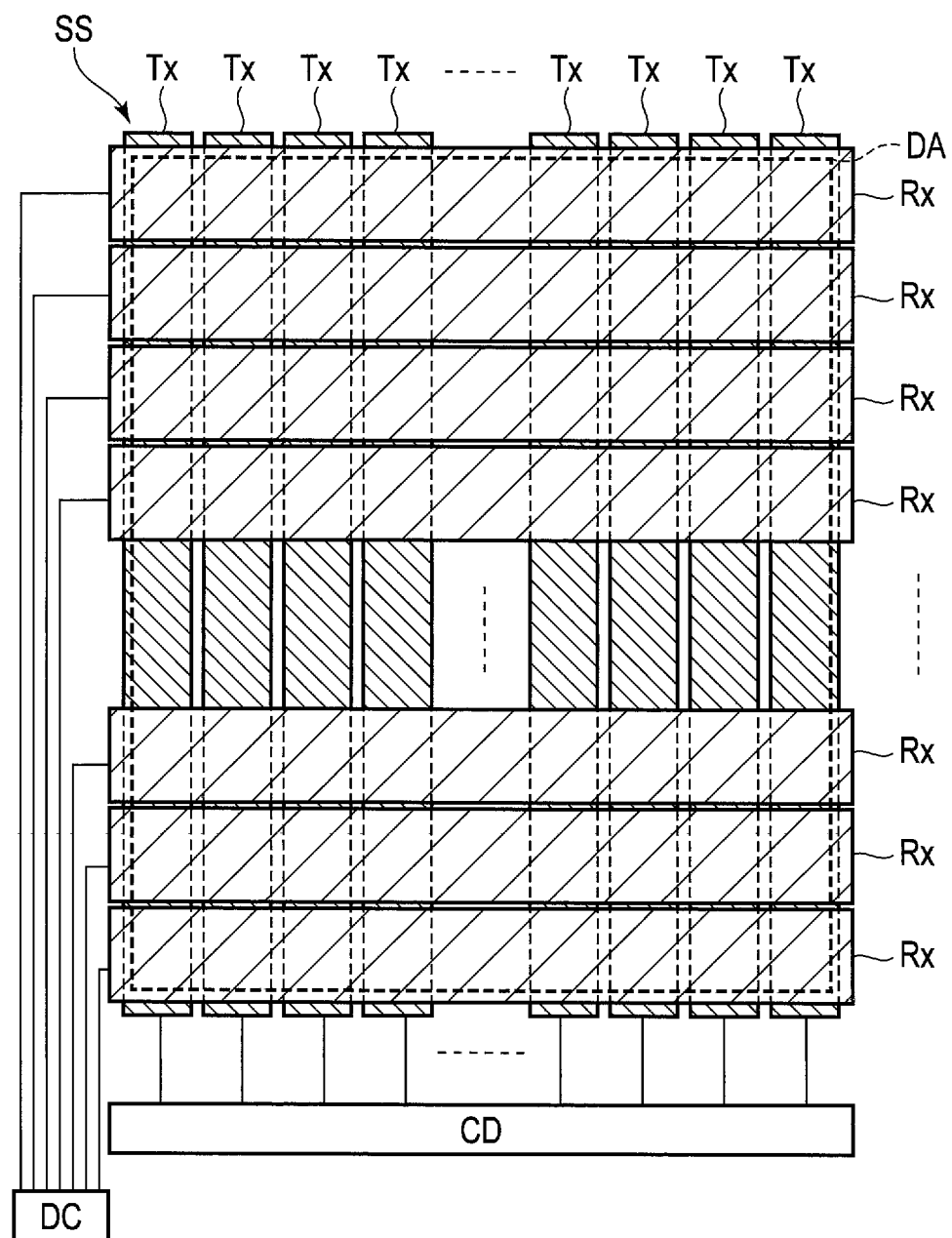
FIG. 5 is a diagram showing a configuration of the sensor SS.

FIG. 5 is a diagram showing a configuration of the sensor SS. The sensor SS comprises sensor drive electrodes (first electrodes) Tx and detection electrodes (second electrodes) Rx. The sensor drive electrodes Tx are formed by common electrodes CE on the first substrate SUB1 shown in FIG. 4. In other words, the common electrodes CE function as the common electrodes CE for display and the sensor drive electrodes Tx serving as sensors SS. As shown in FIG. 4, the detection electrode Rx is located on the second upper surface SUB2A.

In the example illustrated, the sensor driving electrodes Tx intersect the detection electrodes Rx in planar view.

The detection electrodes Rx are electrically connected to a detection circuit DC. The common electrode driver CD supplies common drive signals to the common electrodes CE in a display period for displaying an image. Thus, an electric field is generated between the common electrode CE and the pixel electrodes PE, and an alignment direction of the liquid crystal molecules of the liquid crystal layer LC is varied from an initial alignment direction, based on the electric field. In addition, the display device DSP has a sensor period for detecting contact or approach of an object after the display period. In the sensor period, the sensor drive signal is supplied to a target common electrode CE, and the common electrode CE thereby serves as the sensor drive electrode Tx. The sensor drive electrode Tx urges capacitance to be generated between the detection electrode Rx and the sensor drive electrode Tx. The detection electrode Rx outputs a sensor signal necessary for sensing (i.e., a signal based on variation of inter-electrode capacitance between the sensor drive electrode Tx and the detection electrode Rx) in accordance with supply of the sensor drive signal to the sensor drive electrode Tx. The detection circuit DC reads the sensor signal from the detection electrode Rx, detects contact or approach of the object to the display device DSP, and detects position information of the object, and the like.

The above-explained sensor SS is not limited to a mutual-capacitive sensor capable of detecting the object, based on the variation in electrostatic capacitance between a pair of electrodes (in the above example, the electrostatic capacitance between the sensor drive electrode Tx and the detection electrode Rx), but may be a self-capacitive sensor capable of detecting the object, based on the variation in electrostatic capacitance between the sensor drive electrode Tx and the object or between the detection electrode Rx and the object.

FIG. 6 is a plan view showing a configuration example of a display device DSP comprising the sensor SS. The display device DSP comprises a first edge E1 and a second edge E2 which extend in the second direction Y, and a third edge E3 and a fourth edge E4 which extend in the first direction X. The detection electrodes Rx are located on the display portion DA and arranged in the second direction Y to be spaced apart from each other. Each of the detection electrodes Rx extends in the first direction X. The second terminal portion T2 comprises a plurality of terminals T arranged in the first direction X to be spaced apart from each other. The detection electrodes Rx and the terminals T are electrically connected by leads L. The detection electrodes Rx, the terminals T, and the leads L are located on the second upper surface SUB2A. The terminals T and the leads L are located at a frame portion NDA.

An example of a layout of the terminals T and the leads L will be explained here. In the example illustrated, leads L connected to the odd-numbered detection electrodes Rx counted from the third edge E3, of the leads L, extend between the display portion DA and the first edge E1 and between the display portion DA and the edge EG and are connected to the terminals T of the protruding portion P. The leads L connected to the even-numbered detection electrodes Rx counted from the third edge E3 extend between the display portion DA and the second edge E2 and are connected to the terminals T.

Figure 7:
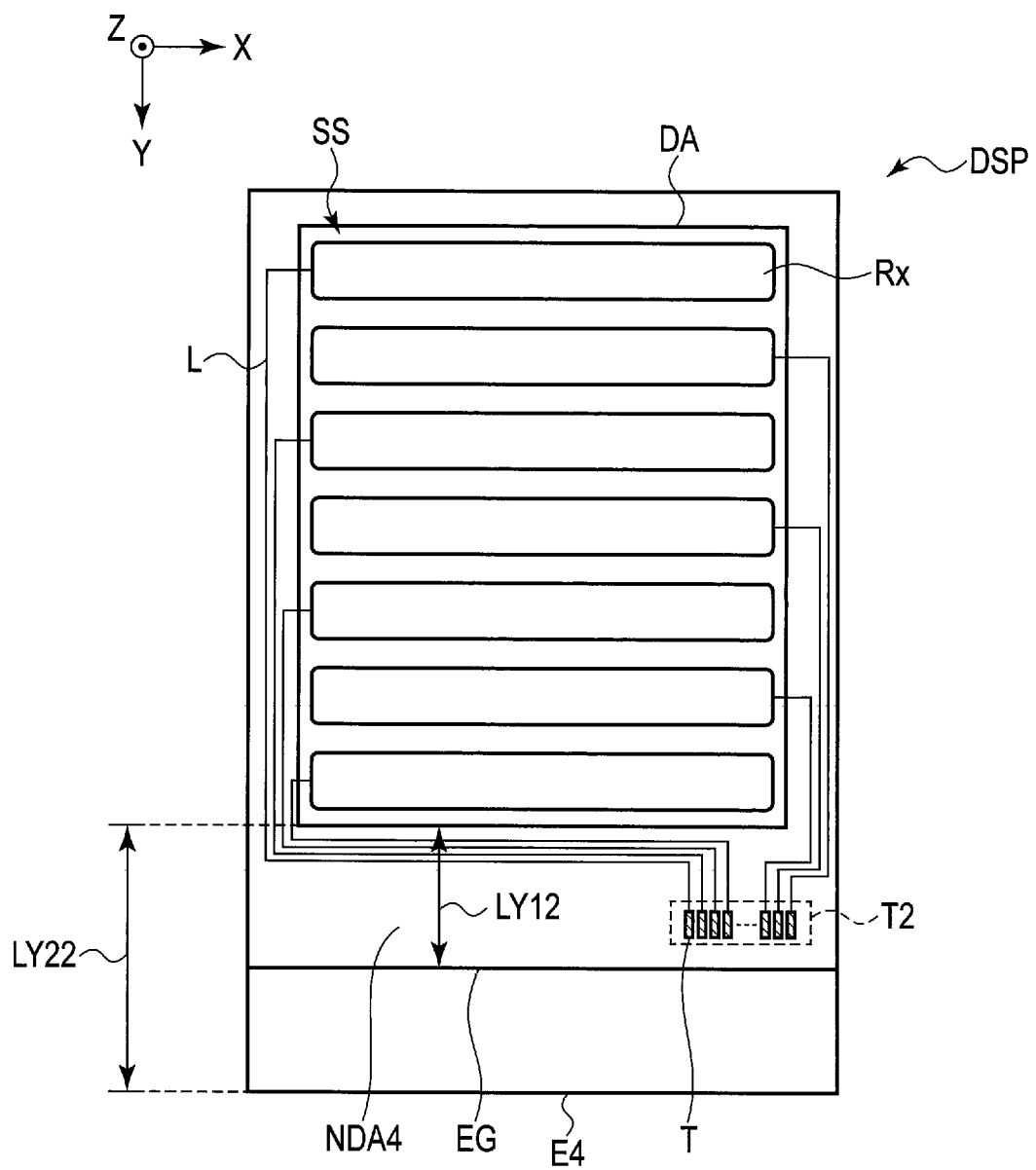
FIG. 7 is a plan view showing a comparative example of the display device DSP comprising the sensor SS.

FIG. 7 is a plan view showing a comparative example of the display device DSP comprising the sensor SS. In the example illustrated, the second substrate SUB2 comprises the linear edge EG extending in the first direction X but does not comprise a protruding portion. In this comparative example, the second terminal portion T2 is located at a frame portion NDA4 between the display portion DA and the edge EG.

According to the configuration example of the present embodiment, the second substrate SUB2 comprises the protruding portion P, and the second terminal portion T2 is located at the protruding portion P. For this reason, according to the configuration example shown in FIG. 6, a width LY11 of the frame portion NDA4 in the second direction Y can be made shorter than a width LY12 of the frame portion NDA4 in the second direction Y in the comparative example shown in FIG. 7. In addition, according to the configuration example shown in FIG. 6, a frame width LY21 between the display portion DA and the fourth edge E4 in the second direction Y can be made shorter than a frame width LY22 between the display portion DA and the fourth edge E4 in the second direction Y in the comparative example shown in FIG. 7. For this reason, the frame can be narrowed.

FIG. 8 is a plan view showing the other configuration example of the display device DSP comprising the sensor SS. The configuration example shown in FIG. 8 is different from the configuration example in FIG. 6 with respect to a layout of the terminals T and the leads L. The second terminal portion T2 comprises a plurality of terminals TA arranged in the first direction X to be spaced apart from each other, and a plurality of terminals TB arranged in the first direction X to be spaced apart from each other. The leads LA extend at the frame portions NDA1 and NDA4 and are connected to the terminals TA. The leads LB extend at the frame portion NDA2 and are connected to the terminals TB. In other words, each of the detection electrodes Rx is connected to the terminal TA via the lead LA and is connected to the terminal TB via the lead LB. The number of terminals TA, the number of terminals TB, the number of leads LA, and the number of leads LB are equal to or larger than the number of detection electrodes Rx.

In the configuration example shown in FIG. 8, too, the same advantages can be obtained.

A configuration in which a display function layer other than the liquid crystal layer, for example, an electrophoretic layer or a self-luminous display element layer is interposed between the first substrate SUB1 and the second substrate SUB2 can also be adopted in the configuration example shown in FIG. 8. In this case, mutual capacitance or self-capacitance touch electrodes are disposed on the second substrate SUB2.

Next, the other configuration example of the display device DSP in which the edge EG includes a curved portion EC will be explained.

Figure 9:
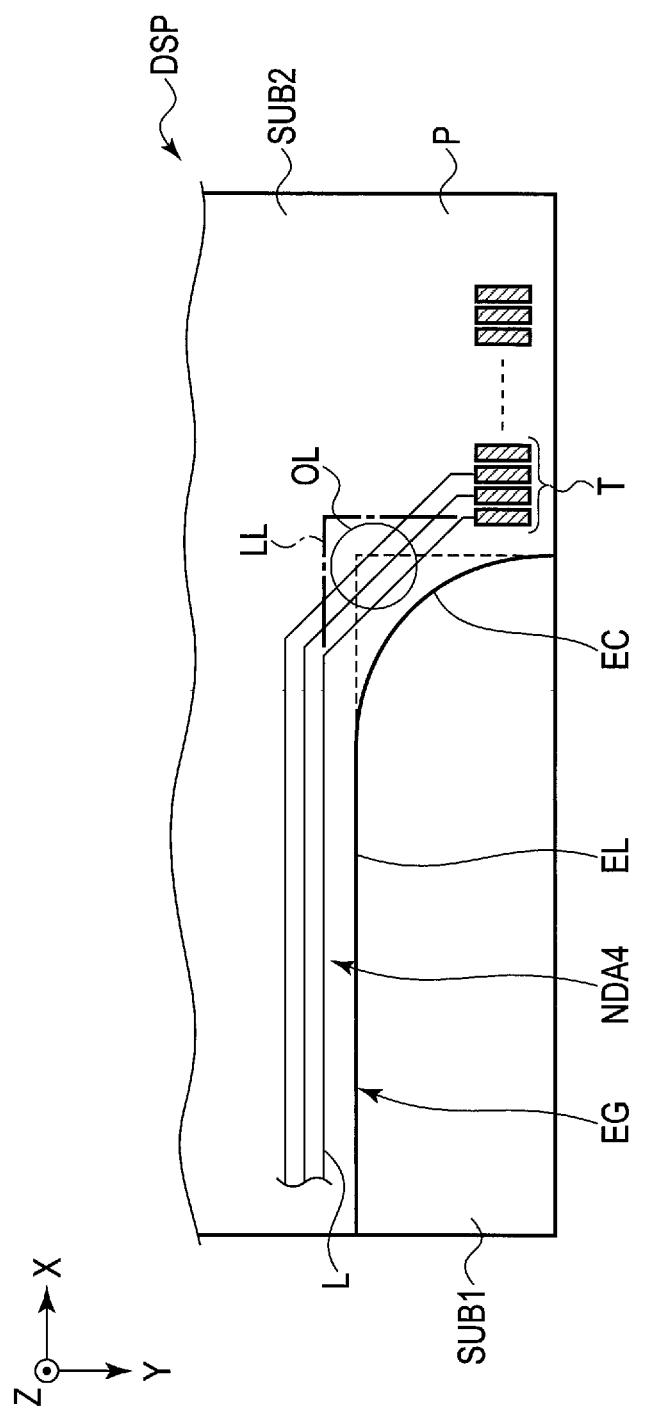
FIG. 9 is a plan view showing the other configuration example of the display device DSP.

FIG. 9 is a plan view showing the other configuration example of the display device DSP. When the second substrate SUB2 comprising the protruding portion P is formed, the edge EG including the curved portion EC as illustrated is formed. For example, if the second substrate SUB2 is formed on a based of a glass substrate, the second substrate SUB2 having the illustrated shape is cut and formed by using a cutting member such as a wheel cutter. When the present configuration example in which the cutting member moves along the linear portion EL and the curved portion EC is compared with the comparative example in which the cutting member moves along the dotted line in the figure, the movement distance of the cutting member can be made shorter in the present configuration example than in the comparative example. Furthermore, the operation of turning the cutting member can be omitted in the present configuration example.

In addition, the leads L located on the frame portion NDA4 can be connected to the terminals T via inclined portions OL along the curved portion EC. In the comparative example, the illustrated inclined portions OL cannot be formed, and the leads L are connected to the terminals T via a linear portion LL as represented by a one-dot-chained line in the figure. For this reason, the length of the leads L can be made shorter than the length in the comparative example and the line resistance of the leads L can be reduced. In addition, concentration of the lines around the terminal portions can be reduced.

FIG. 10 is a diagram showing a configuration example of the display device DSP comprising a first flexible substrate FS1 and a second flexible substrate FS2.

The first flexible substrate FS1 comprises a connection portion CN1 connected to the non-overlap portion NOP or the first area A1 of the first substrate SUB1 and the connection portion CN1 is connected to the first terminal portion T1. The second flexible substrate FS2 comprises a connection portion CN2 connected to the protruding portion P of the second substrate SUB2 and the connection portion CN2 is connected to the second terminal portion T2. A connection portion CN3 of the first flexible substrate FS1 is connected to a connection portion CN4 of the second flexible substrate FS2. The connection portions CN1 to CN4 are represented by hatch lines in the figure.

An IC chip I1 is connected to the non-overlap portion NOP. The IC chip I1 incorporates, for example, at least a part of the display driver DD shown in FIG. 3. The IC chip I2 is connected to the first flexible substrate FS1. The IC chip I2 incorporates, for example, the detection circuit DC shown in FIG. 5. The second terminal portion T2 and the IC chip I2 are electrically connected to each other. The IC chip I1 and the IC chip I2 are electrically connected to each other.

According to the configuration example, as compared with the comparative example shown in FIG. 7, since the second terminal portion T2 can be disposed near the fourth edge E4, the length in the second direction Y, of the second flexible substrate FS2 connected to the second terminal portion T2, can be shortened and the second flexible substrate FS2 can be downsized.

FIG. 11 is a diagram showing the other configuration example of the display device DSP comprising the first flexible substrate FS1 and the second flexible substrate FS2.

The configuration example shown in FIG. 11 is different from the configuration example shown in FIG. 10 with respect to a feature that the IC chip I1 is connected to the first flexible substrate FS1. The first flexible substrate FS1 comprises a first connection portion CN1 connected to the first terminal portion T1 and a third connection portion CN3 connected to the second flexible substrate FS2, in the same plane (i.e., the lower surface of the first flexible substrate FS1). The IC chip I1 is connected to the lower surface of the first flexible substrate FS1.

The second flexible substrate FS2 comprises a second connection portion CN2 connected to the second terminal portion T2 and a fourth connection portion CN4 connected to the first flexible substrate FS1. The second connection portion CN2 is disposed on a lower surface of the second flexible substrate FS2. The fourth connection portion CN4 is disposed on an upper surface of the second flexible substrate FS2. The IC chip I2 is connected to the lower surface or the upper surface of the second flexible substrate FS2.

According to this configuration example, as compared with the configuration example shown in FIG. 10, the frame width of the non-overlap portion NOP in the second direction Y can be reduced and the frame can be further narrowed.

FIG. 12 is a diagram showing the other configuration example of the display device DSP comprising a single flexible substrate FS.

The configuration example shown in FIG. 12 is different from the configuration examples shown in FIG. 10 and FIG. 11 with respect to a feature of comprising a single flexible substrate FS connected to both of the first terminal portion T1 and the second terminal portion T2. The flexible substrate FS comprises the first connection portion CN1 connected to the first terminal portion T1 and the second connection portion CN2 connected to the second terminal portion T2. In addition, the flexible substrate FS comprises the IC chip I1. For example, the IC chip I1 incorporates at least a part of the display driver DD shown in FIG. 3 to drive the pixels PX in the display period, and incorporates the detection circuit DC shown in FIG. 5 to drive the sensor SS in the sensing period. The IC chip I1 comprises a function of converting an analog signal received from the sensor SS in the sensing period into digital data and outputting the digital data to a host which executes position detection and the like.

According to this configuration example, as compared with the configuration examples shown in FIG. 10 and FIG. 11, the number of flexible substrates can be reduced and costs can also be reduced. In addition, a connector to electrically connect a plurality of flexible substrates to each other is unnecessary.

Figure 13:
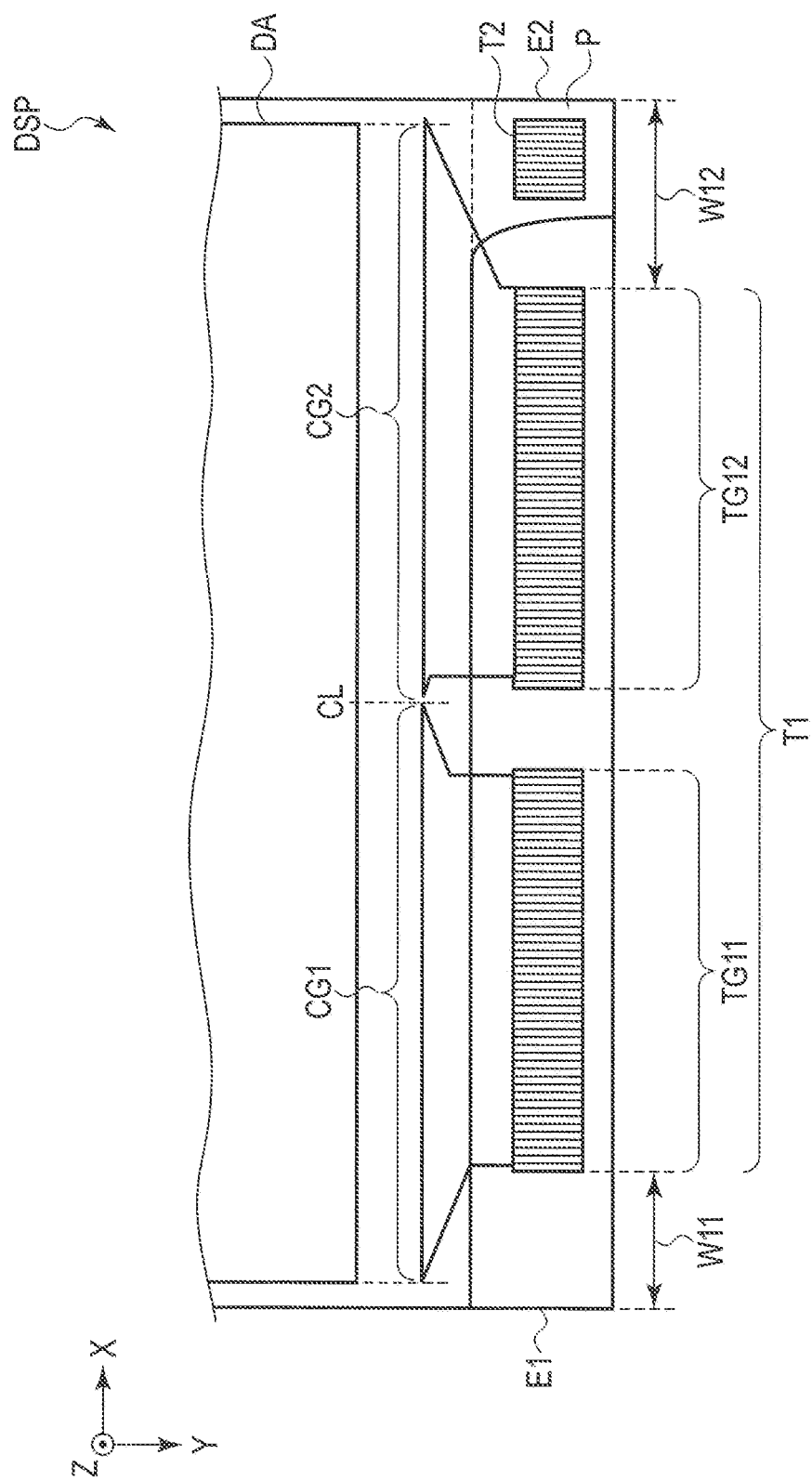
FIG. 13 is a diagram showing an example of a layout of the first terminal portion T1.

FIG. 13 is a diagram showing an example of a layout of the first terminal portion T1.

A width W11 in the first direction X between the first edge E1 and the first terminal portion T1 is smaller than a width W12 in the first direction X between the first terminal portion T1 and the second edge E2. The protruding portion P is located between the first terminal portion T1 and the second edge E2.

In the example illustrated, the first terminal portion T1 comprises a first terminal group TG11 and a second terminal group TG12. The first terminal group TG11 and the second terminal group TG12 are arranged in the first direction X. The first terminal group TG11 and the second terminal group TG12 are connected to a first line group CG1 and a second line group CG2 to drive the display portion DA, respectively. The first terminal group TG11 and the second terminal group TG12 are arranged asymmetrically with respect to a center line CL from which the first edge E1 and the second edge E2 are separated in an equal distance. In addition, the first line group CG1 and the second line group CG2 are arranged asymmetrically with respect to the center line CL.

In this layout, the protruding portion P can be provided without overlapping the first terminal portion T1 and, furthermore, the first terminal portion T1 and the second terminal portion T2 can be arranged in line.

Next, an example of the holding layer HL shown in FIG. 1 will be explained.

Figure 14:
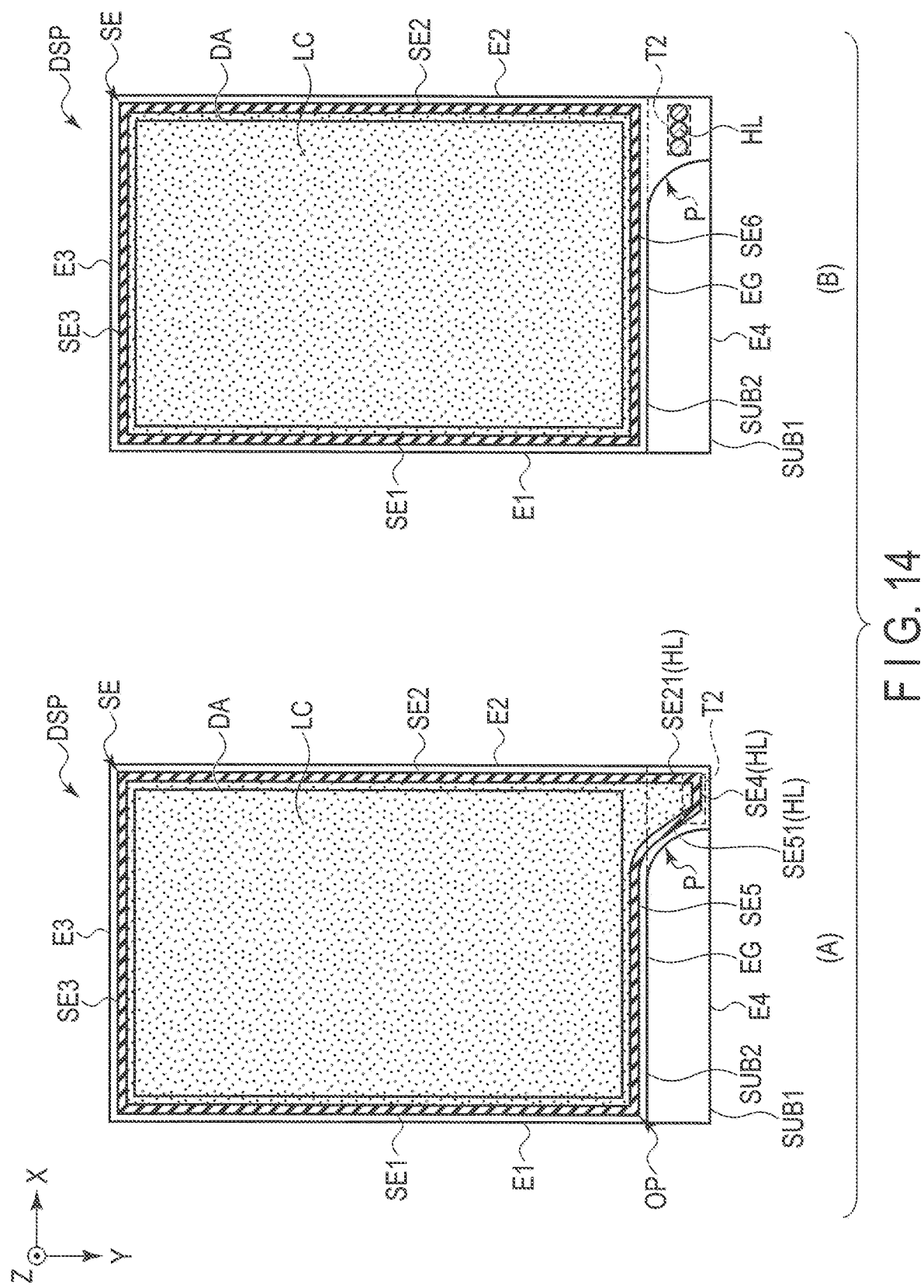
FIG. 14 is a plan view showing an example applied to the display device DSP according to the embodiments.

FIG. 14 is a plan view showing an example applied to the display device DSP according to the embodiments.

In a first example shown in FIG. 14(A), an adhesive layer SE which bonds the first substrate SUB1 and the second substrate SUB2 is disposed on the overlap portion OP, and corresponds to a sealant which seals the liquid crystal layer LC. The adhesive layer SE comprises an adhesive portion SE1 extending along the first edge E1, an adhesive portion SE2 extending along the second edge E2, an adhesive portion SE3 extending along the third edge E3, an adhesive portion SE4 extending along the fourth edge E4, and an adhesive portion SE5 extending along the edge EG The adhesive portion SE2 is longer than the adhesive portion SE1. A part SE21 of the adhesive portion SE2, the adhesive portion SE4, and a part SE51 of the adhesive portion SE5 overlap the protruding portion P, and these correspond to the holding layer HL which holds a gap between the first substrate SUB1 and the protruding portion P. In the example illustrated, the adhesive portion SE4 is located directly under the second terminal portion T2. For this reason, when the flexible substrate is crimped on the second terminal portion T2, the holding layer HL including the adhesive portion SE4 supports the second substrate SUB2 and deformation of the second substrate SUB2 can be thereby suppressed. In addition, since the liquid crystal layer LC is also located on the protruding portion P, the display portion DA may also be provided on the protruding portion P.

A second example shown in FIG. 14(B) is different from the first example with respect to a feature that the adhesive layer SE is formed in a quadrilateral shape. The adhesive layer SE comprises the adhesive portions SE1 and SE2 which extend in the second direction Y and have an equal length, and the adhesive portions SE3 and SE6 which extend in the first direction X and have an equal length. Neither the adhesive layer SE nor the liquid crystal layer LC is interposed between the first substrate SUB1 and the protruding portion P. In contrast, the holding layer HL is provided at a position remote from the adhesive layer SE and the liquid crystal layer LC, in an area where the first substrate SUB1 and the protruding portion P overlap. In the example illustrated, the holding layer HL is located directly under the second terminal portion T2. In the second example, too, the same advantages as those of the first example can be obtained.

Figure 15:
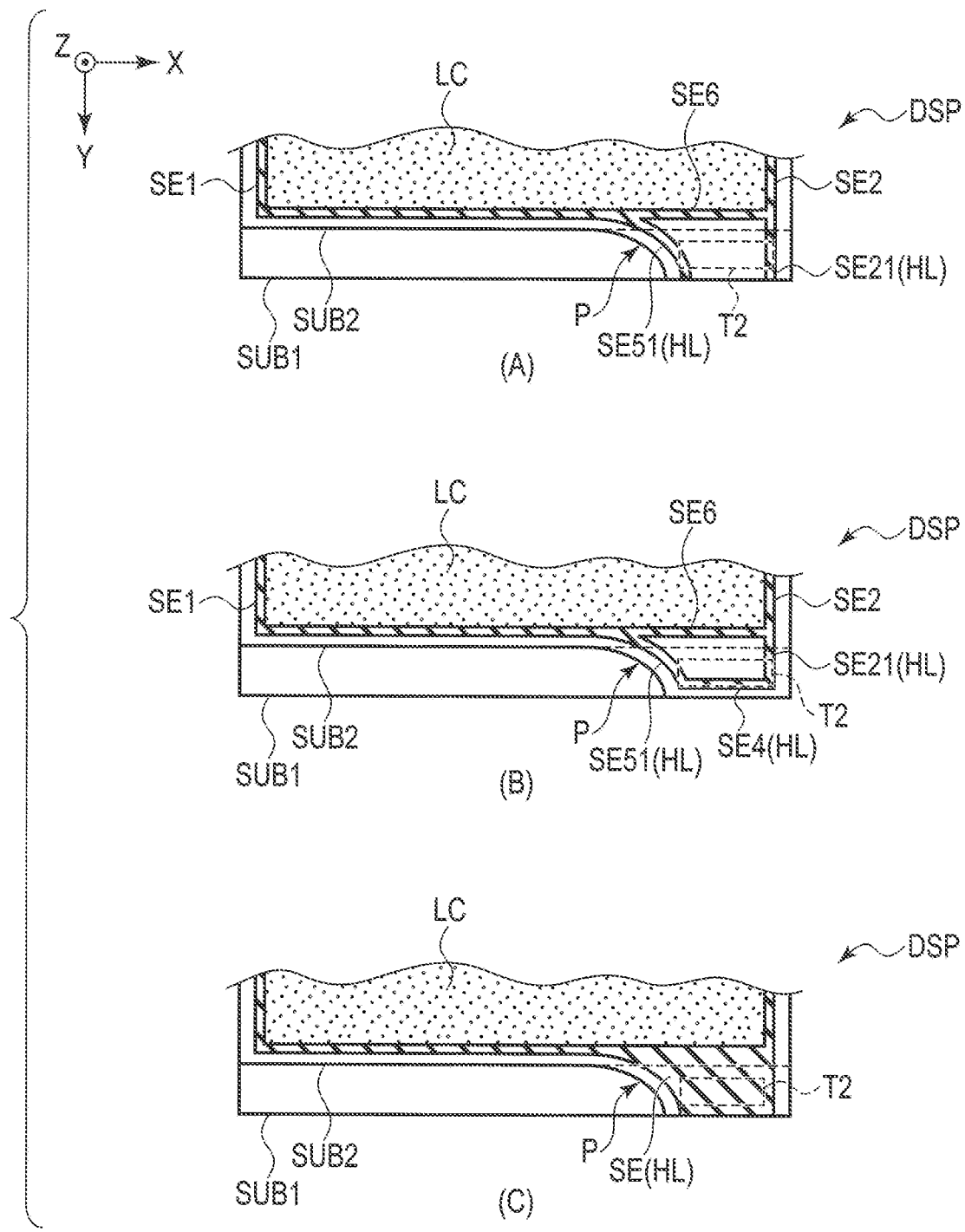
FIG. 15 is a plan view showing the other example applied to the display device DSP according to the embodiments.

FIG. 15 is a plan view showing the other example applied to the display device DSP according to the embodiments.

In a third example shown in FIG. 15(A), the part SE21 of the adhesive portion SE2 and the part SE51 of the adhesive portion SE5 overlap the protruding portion P, and these correspond to the holding layer HL which holds the gap between the first substrate SUB1 and the protruding portion P. The parts SE21 and SE51 are spaced apart from each other. An air layer exists between the first substrate SUB1 and the protruding portion P directly under the second terminal portion T2, and a part of the second terminal portion T2 overlaps the parts SE21 and SE51. In the third example, too, the same advantages as those of the first example can be obtained. The holding layer HL may be additionally provided directly under the second terminal portion T2, similarly to the second example.

In a fourth example shown in FIG. 15(B), the part SE21 of the adhesive portion SE2, the adhesive portion SE4, and the part SE51 of the adhesive portion SE5 overlap the protruding portion P, and these correspond to the holding layer HL which holds the gap between the first substrate SUB1 and the protruding portion P. An area surrounded by the adhesive portions SE4 and SE6, and the parts SE21 and SE51 is sealed and the liquid crystal layer LC is not disposed. In the fourth example, too, the same advantages as those of the first example can be obtained. The holding layer HL may be additionally provided directly under the second terminal portion T2, similarly to the second example.

In a fifth example shown in FIG. 15(C), a gap between the first substrate SUB1 and the protruding portion P is filled with the adhesive layer SE. In other words, the adhesive layer SE of the area where the first substrate SUB1 and the protruding portion P overlap corresponds to the holding layer HL and is located directly under the second terminal portion T2. In the fifth example, too, the same advantages as those of the first example can be obtained.

Figure 16:
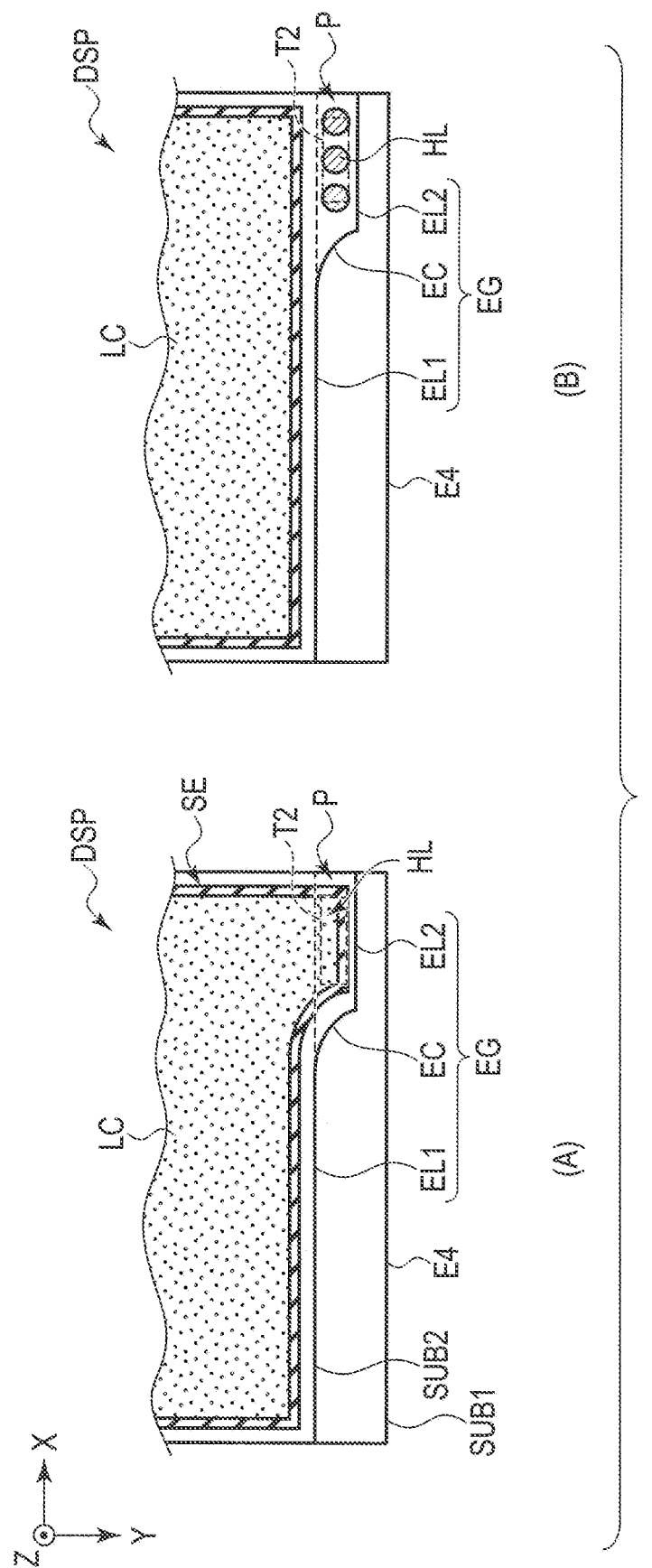
FIG. 16 is a plan view showing the other example applied to the display device DSP according to the embodiments.

FIG. 16 is a plan view showing the other example applied to the display device DSP according to the embodiments.

A sixth example shown in FIG. 16(A) is different from the first example with respect to a feature that the edge EG of the second substrate SUB2 includes a linear portion EL2 located at the side closer to the liquid crystal layer LC than to the fourth edge E4. The liquid crystal layer LC and a part of the adhesive layer SE are disposed in the area where the first substrate SUB1 and the protruding portion P overlap. The adhesive layer SE which functions as the holding layer HL is located directly under the second terminal portion T2. In the sixth example, too, the same advantages as those of the first example can be obtained.

A seventh example shown in FIG. 16(B) is different from the second example with respect to a feature that the edge EG of the second substrate SUB2 includes the linear portion EL2. Neither the liquid crystal layer LC nor a part of the adhesive layer SE is disposed in the area where the first substrate SUB1 and the protruding portion P overlap. The holding layer HL is located directly under the second terminal portion T2. In the seventh example, too, the same advantages as those of the first example can be obtained.

The above-explained first to seventh examples can also be applied to the display device DSP comprising a round portion. A representative example will be explained hereinafter with reference to FIG. 17.

FIG. 17 is a plan view showing the other example applied to the display device DSP according to the embodiments.

The display device DSP of an eighth example shown in FIG. 17(A) comprises a round portion R14 shaped in a protruding arc, which is located between the first edge E1 and the fourth edge E4, and a round portion R24 shaped in a protruding arc, which is located between the second edge E2 and the fourth edge E4. The other constituent elements are the same as those of the first example, and a part of the adhesive layer SE is located directly under the second terminal portion T2.

The curvature of the curved portion EC should desirably be the same as the curvature of the round portion R14.

The display device DSP of a ninth example shown in FIG. 17(B) is different from the second example with respect to a feature that the display device DSP comprises the round portions R14 and R24, and is the same as the second example with respect to the other constituent elements.

The display device DSP of a tenth example shown in FIG. 17(C) is different from the seventh example with respect to a feature that the display device DSP comprises the round portions R14 and R24, and is the same as the seventh example with respect to the other constituent elements.

In any one of the above-explained examples, too, the same advantages as those explained above can be obtained.

Figure 18:
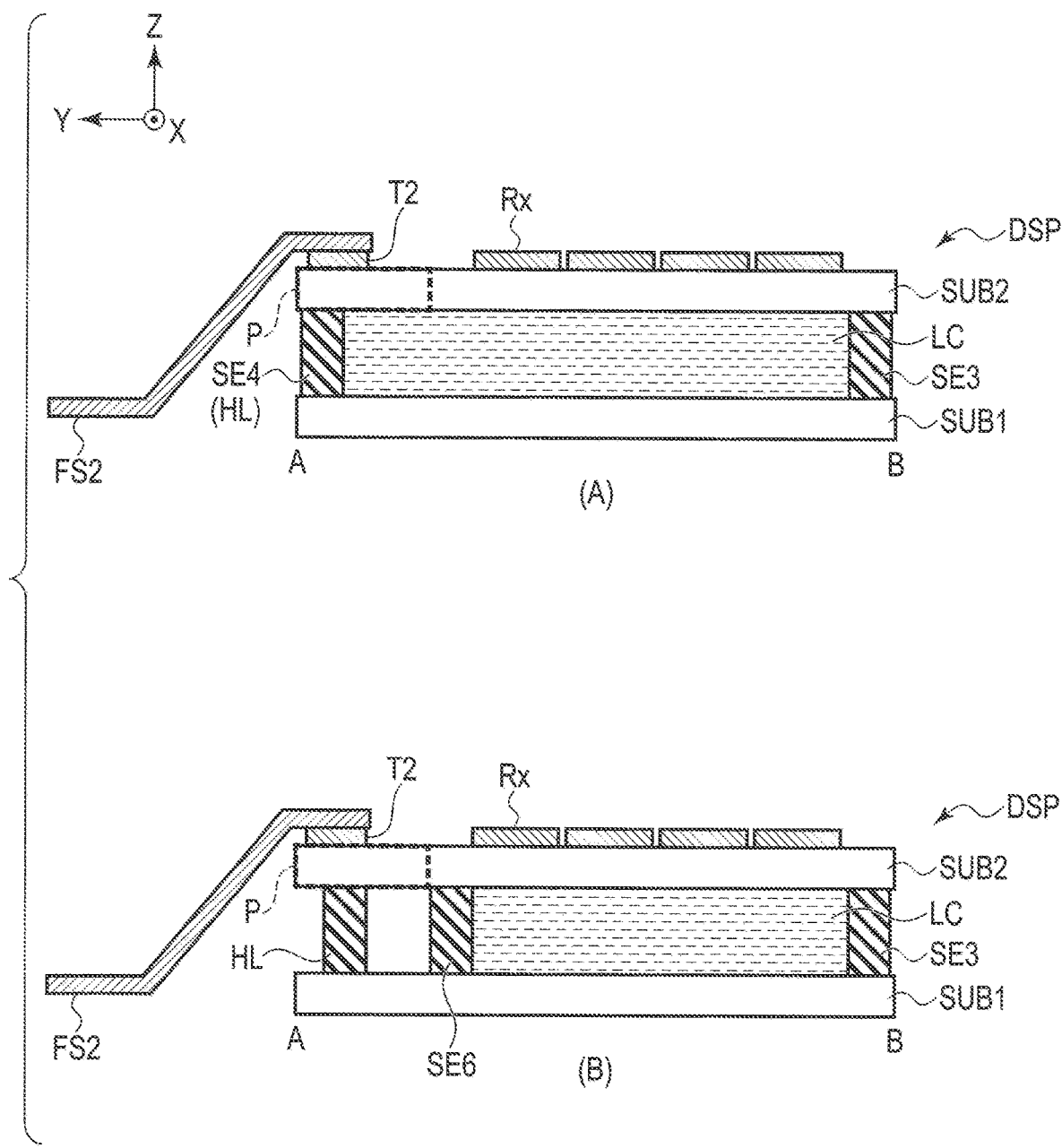
FIG. 18 is a cross-sectional view showing the display device DSP comprising a second terminal portion T2 cut along line A-B in FIG. 10.

FIG. 18 is a cross-sectional view showing the display device DSP comprising a second terminal portion T2 cut along line A-B in FIG. 10. The configuration of the holding layer HL will be particularly explained.

The cross-sectional view shown in FIG. 18(A) corresponds to, for example, the first example shown in FIG. 14(A). The adhesive portion SE4 of the adhesive layer SE is bonded to the first substrate SUB1 and the protruding portion P and is located directly under the second terminal portion T2. The second flexible substrate FS2 is connected to the second terminal portion T2. The adhesive portion SE4 corresponds to the holding layer HL.

The cross-sectional view shown in FIG. 18(B) corresponds to, for example, the second example shown in FIG. 14(B). The holding layer HL is spaced apart from the adhesive portion SE6 of the adhesive layer SE. For example, the holding layer HL can be formed of a resin layer. The holding layer HL is formed in, for example, a columnar shape or a wall shape extending in the third direction Z and is located between the first substrate SUB1 and the protruding portion P. For example, the holding layer HL may be formed on the first substrate SUB1 or the second substrate SUB2, or may be formed by making protrusions formed on the first substrate SUB1 and the second substrate SUB2 protrude toward each other.

Figure 19:
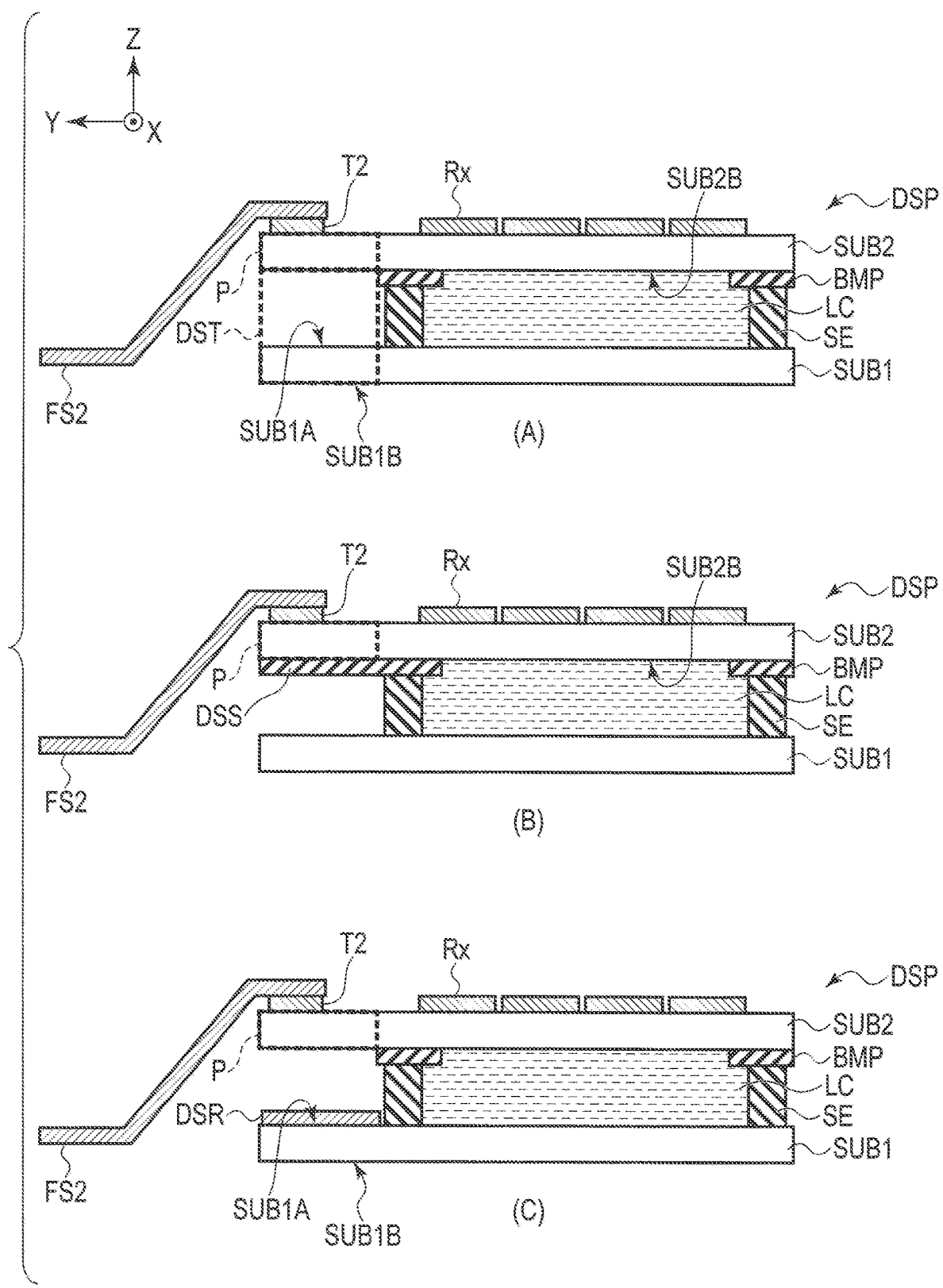
FIG. 19 is a cross-sectional view showing the display device DSP comprising a second terminal portion T2 cut along line A-B in FIG. 10.

FIG. 19 is a cross-sectional view showing the display device DSP comprising a second terminal portion T2 cut along line A-B in FIG. 10. The configuration of the area overlapping the protruding portion P will be particularly explained.

In a configuration example shown in FIG. 19(A), the protruding portion P overlaps a transparent portion DST of the display device DSP. A light-shielding member is not substantially disposed on the first upper surface SUB1A and the first lower surface SUB1B of the first substrate SUB1 which overlaps the protruding portion P, and between the first upper surface SUB1A and the protruding portion P, and the light traveling from the first lower surface SUB1B toward the protruding portion P can be transmitted. For example, the second substrate SUB2 comprises the light-shielding layer BM explained with reference to FIG. 4 on the second lower surface SUB2B, and also comprises a peripheral light-shielding layer BMP in an area overlapping the adhesive layer SE. However, the peripheral light-shielding layer BMP is not disposed in an area overlapping the protruding portion P. In this configuration example, when the second flexible substrate FS2 is connected to the second terminal portion T2 provided on the protruding portion P, alignment of the second terminal portion T2 and the second flexible substrate FS2 can be executed by using the light transmitted from the first substrate SUB1.

In a configuration example shown in FIG. 19(B), the protruding portion P overlaps a light-shielding portion DSS of the display device DSP. The light-shielding portion DSS is, for example, a peripheral light-shielding layer BMP disposed in the area which overlaps the protruding portion P. The light-shielding portion DSS is not necessarily provided on the second substrate SUB2, but may be provided on the first substrate SUB1 or may be provided between the first substrate SUB1 and the second substrate SUB2. In this configuration example, leakage of light at the protruding portion P can be suppressed.

In a configuration example shown in FIG. 19(C), the protruding portion P overlaps a reflecting portion DSR of the display device DSP. The reflecting portion DSR is, for example, a metal layer disposed in the area which overlaps the protruding portion P. The reflecting portion DSR is not necessarily provided on the first substrate SUB1 but may be provided on the second substrate SUB2. In this configuration example, when the second flexible substrate FS2 is connected to the second terminal portion T2, alignment of the second terminal portion T2 and the second flexible substrate FS2 can be executed by using the light reflected from the reflecting portion DSR. In addition, leakage of light at the protruding portion P can be suppressed.

Figure 20:
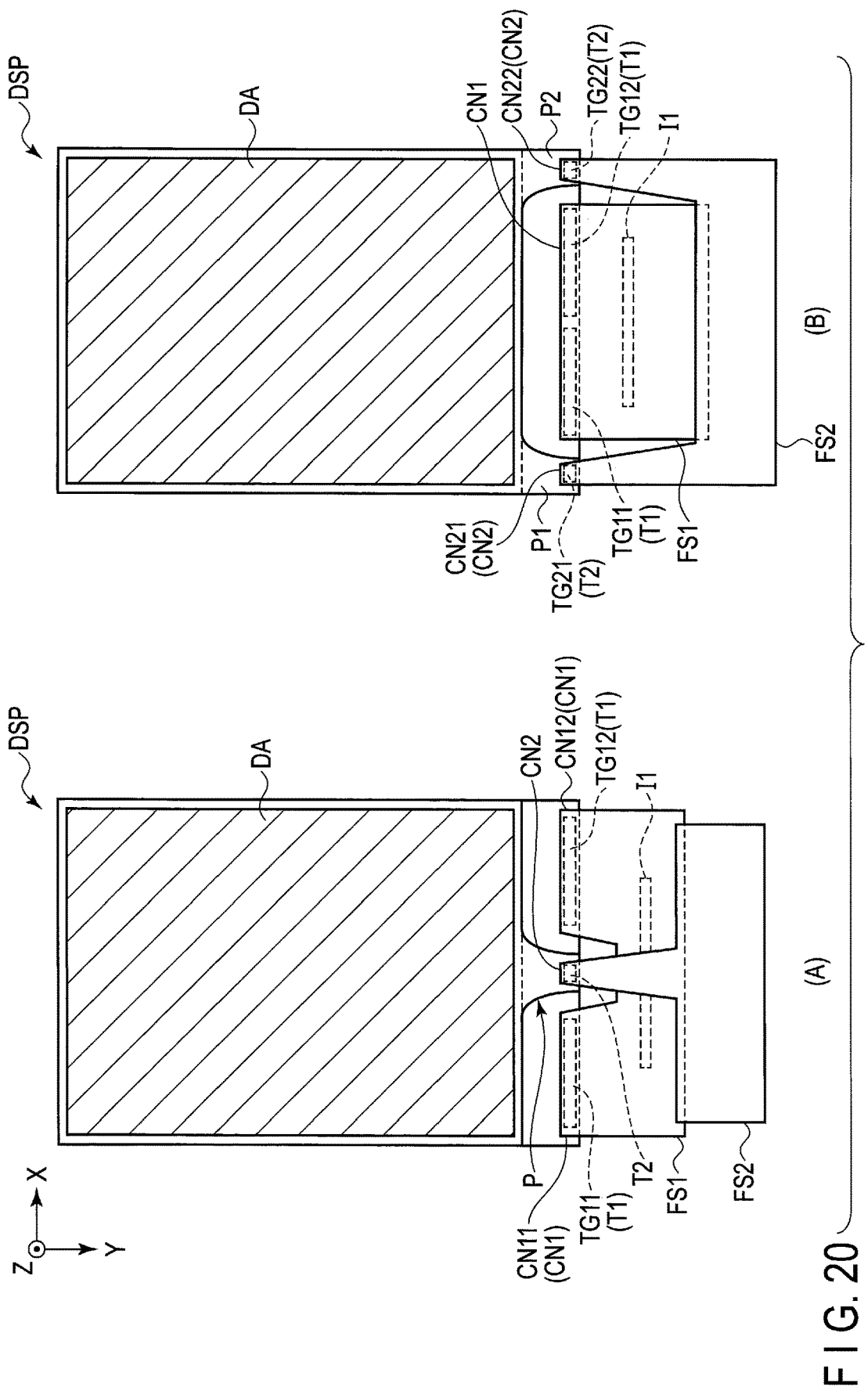
FIG. 20 is a diagram showing the other configuration example of the display device DSP.

FIG. 20 is a diagram showing the other configuration example of the display device DSP.

The configuration example shown in FIG. 20(A) is different from the above-explained configuration examples with respect to a feature that the second substrate SUB2 comprises a protruding portion P located between the first terminal group TG11 and the second terminal group TG12 of the first terminal portion T1. The second terminal portion T2 of the protruding portion P is located between the first terminal group TG11 and the second terminal group TG12 in planar view. In the example illustrated, the first terminal group TG11, the second terminal portion T2, and the second terminal group TG12 are arranged in this order in the first direction X and located in line in the first direction X. Of course, this configuration allows slight displacement of the terminal group in the second direction Y. The first connection portion CN1 of the first flexible substrate FS1 comprises a connection portion CN11 connected to the first terminal group TG11 and a connection portion CN12 connected to the second terminal group TG12. The second flexible substrate FS2 comprises the second connection portion CN2 connected to the second terminal portion T2. The second connection portion CN2 is located between the connection portions CN11 and CN12 in planar view. The second terminal portion T2 can be provided at a central portion with respect to the display portion DA, and the first terminal group TG11 and the second terminal group TG12 can be provided at positions having lateral symmetry with respect to the display portion DA. Similarly, the first flexible substrate FS1, the second flexible substrate FS2, and the IC chip I1 can be provided to have lateral symmetry with respect to the display portion DA.

The configuration example shown in FIG. 20(B) is different from the above-explained configuration examples with respect to a feature that the second substrate SUB2 comprises protruding portions P1 and P2 on respective sides of the first terminal portion T1. The second terminal portion T2 comprises a third terminal group TG21 located on the protruding portion P1 and a fourth terminal group TG22 located on the protruding portion P2. The first terminal portion T1 is located between the third terminal group TG21 and the fourth terminal group TG22 in planar view. In the example illustrated, the third terminal group TG21, the first terminal group TG11, the second terminal group TG12, and the fourth terminal group TG22 are arranged in this order in the first direction X and located in line in the first direction X. The first connection portion CN1 of the first flexible substrate FS1 is connected to the first terminal group TG11. The second connection portion CN2 of the second flexible substrate FS2 comprises a connection portion CN21 connected to the third terminal group TG21 and a connection portion CN22 connected to the fourth terminal group TG22. The first connection portion CN1 is located between the connection portions CN21 and CN22 in planar view.

The first terminal group TG11 and the second terminal group TG12 can be provided at positions having lateral symmetry with respect to the display portion DA, and the third terminal group TG21 and the fourth terminal group TG22 can be provided at positions having lateral symmetry with respect to the display portion DA. Similarly, the first flexible substrate FS1, the second flexible substrate FS2, and the IC chip I1 can be provided to have lateral symmetry with respect to the display portion DA.

The first flexible substrate FS1 and the second flexible substrate FS2 shown in the figure can be replaced with a single flexible substrate.

The first terminal portion T1 can be disposed symmetrically by applying the configuration example shown in FIG. 20. This point will be explained with reference to FIG. 21.

FIG. 21 is a diagram showing the other example of the layout of the first terminal portion T1.

The first terminal portion T1 is arranged symmetrically with respect to the center line CL between the first edge E1 and the second edge E2. The width W11 in the first direction X between the first edge E1 and the first terminal portion T1 is equal to the width W12 in the first direction X between the first terminal portion T1 and the second edge E2. The first terminal group TG11 and the second terminal group TG12 are arranged symmetrically with respect to the center line CL. In addition, the first line group CG1 connected to the first terminal group TG11 and the second line group CG2 connected to the second terminal group TG12 are arranged symmetrically with respect to the center line CL.

In this layout, signal delay caused by the difference between the line length of each line of the first line group CG1 and the line length of each line of the second line group CG2 can be suppressed. In addition, the first flexible substrate FS1 and the IC chip I1 can be provided to have lateral symmetry with respect to the display portion DA.

FIG. 22 is a plan view showing a modified example of the embodiments.

The display device DSP of a first modified example shown in FIG. 22(A) comprises protruding portions P1 and P2 on respective sides of the first terminal portion T1.

Similarly to the first example shown in FIG. 14(A), the liquid crystal layers are interposed between the first substrate SUB1 and the protruding portion P1 and between the first substrate SUB1 and the protruding portion P2. The display portion DA is expanded to an area which overlaps the protruding portions P1 and P2 as represented by hatch lines in the figure. Thus, the display portion DA is expanded to the area closer to the fourth edge E4, on both sides sandwiching the first flexible substrate FS1. Not only the quadrilateral display portion DA, but the display portion DA having a different shape can be realized.

The display device DSP of a second modified example shown in FIG. 22(B) comprises the second substrate SUB2 having an approximately pentagonal shape. The second substrate SUB2 comprises a side S21 which overlaps the first edge E1, a side S22 which overlaps the second edge E2, a side S23 which overlaps the third edge E3, and sides S24 sand S25 intersecting the first direction X and the second direction Y. In addition, the second substrate SUB2 comprises the protruding portion P including sides S24 and S25. The display portion DA is expanded to an area overlapping the protruding portion P as represented by hatch lines in the figure. The display portion DA having an approximately pentagonal shape can be thereby realized.

FIG. 23 is a plan view showing a third modified example of the embodiments.

The display device DSP of the third modified example comprises a sensor SN which overlaps the protruding portion P. The sensor SN is, for example, a touch sensor which detects contact or approach of an object, a fingerprint sensor which detects a fingerprint, a photo-sensor which measures luminance, or the like. The position of the sensor SN does not overlap the display portion DA.

FIG. 24 is a cross-sectional view showing the display device DSP comprising a sensor SN cut along line C-D in FIG. 23.

In the example illustrated, the sensor SN is disposed on the second upper surface SUB2A of the second substrate SUB2. The second optical element OD2 including the second polarizer PL2 is bonded on the second upper surface SUB2A, but does not extend to the protruding portion P or does not overlap the sensor SN. The holding layer HL is located directly under the sensor SN. A cover member CM is, for example, a glass substrate or a resin substrate. The cover member CM is bonded to the second optical element OD2 by an adhesive layer AD. In addition, the cover member CM comprises a through-hole TH which penetrates the cover member CM toward the sensor SN. An object is thereby enabled to contact the sensor SN. A structure of thinning the only area of the cover member CM that is opposed to the sensor SN can be adopted instead of the through-hole TH. Alternatively, a structure of filling the through-hole TH with a conductive material can also be adopted.

Figure 25:
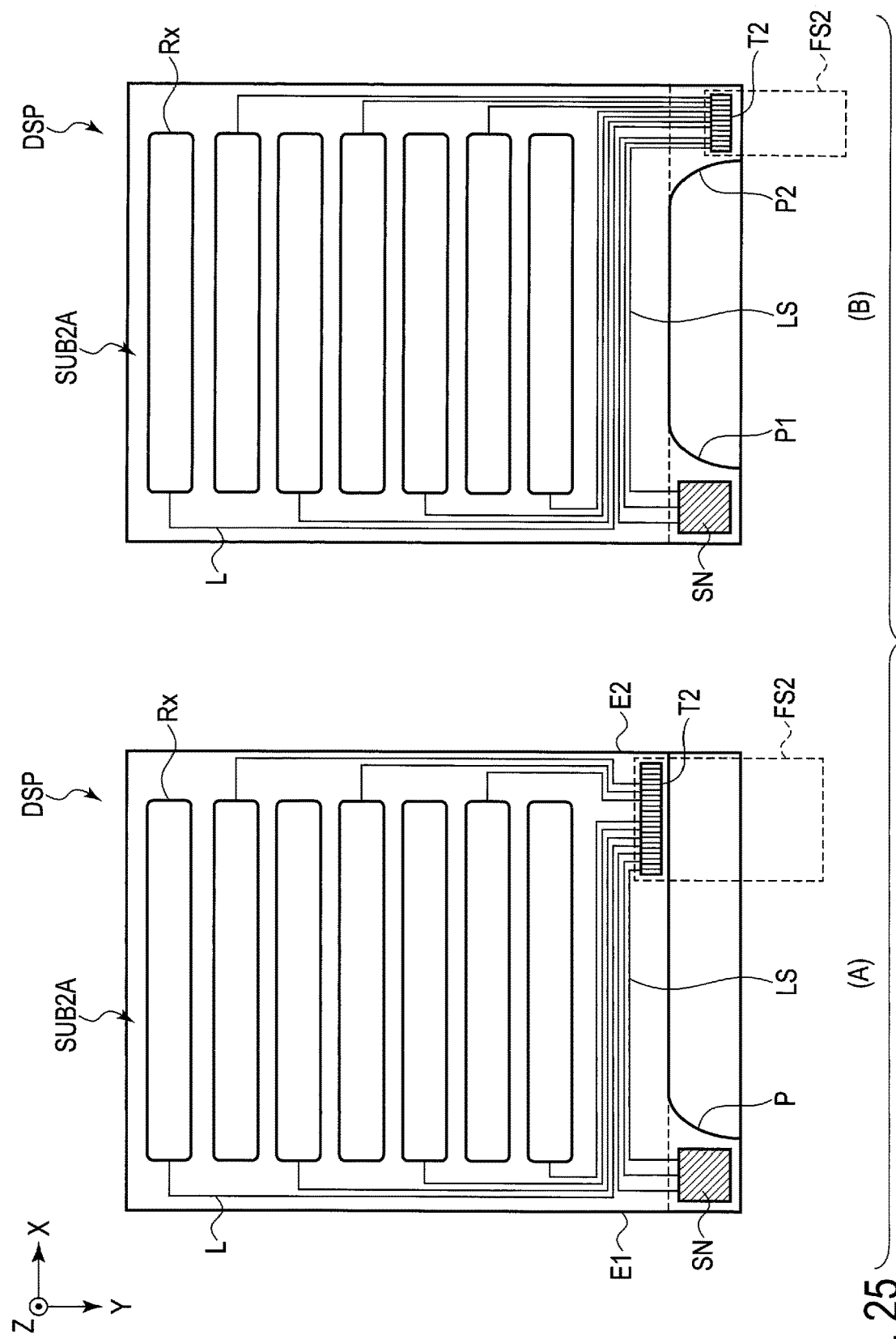
FIG. 25 is a plan view showing a connection structure example of the sensor SN and the second flexible substrate FS2.

FIG. 25 is a plan view showing a connection structure example of the sensor SN and the second flexible substrate FS2.

In a structural example shown in FIG. 25(A), the detection electrodes Rx and the second terminal portion T2 are electrically connected by the leads L, and the sensor SN and the second terminal portion T2 are electrically connected by the leads LS. The detection electrodes Rx, the sensor SN, the second terminal portion T2, and the leads L and LS are disposed on the second upper surface SUB2A. In the example illustrated, the sensor SN is located on a side closer to the first edge E1, and the second terminal portion T2 is located on a side closer to the second edge E2. The second terminal portion T2 and the second flexible substrate FS2 are electrically connected to each other.

In a structural example shown in FIG. 25(B), the sensor SN is disposed on the protruding portion P1 while the second terminal portion T2 is disposed on the protruding portion P2. The sensor SN is electrically connected to the second terminal portion T2 by the leads LS.

In any one of the structural examples shown in FIG. 25, the second flexible substrate FS2 is connected to a position different from the protruding portion where the sensor SN is disposed, and the sensor SN and the second flexible substrate FS2 are electrically connected to each other. The second flexible substrate FS2 functions as a transmission path through which the signals from the detection electrodes Rx and the signals from the sensor SN are transmitted. According to this structural example, since the detection electrodes Rx and the sensor SN are disposed on the same surface (second upper surface SUB2A), the second terminal portion T2 for transmission of these signals can be integrated at one position and the signals can be taken out by the single flexible substrate.

FIG. 26 is a plan view showing the other connection structure example of the sensor SN and the second flexible substrate FS2.

In a structural example shown in FIG. 26, the sensor SN is disposed on the protruding portion P1 while the second terminal portion T2 is disposed on the protruding portion P2. The second terminal portion T2 is electrically connected to the second flexible substrate FS2, on the protruding portion P2. The sensor SN is electrically connected to the third flexible substrate FS3, on the protruding portion P1. The second flexible substrate FS2 and the third flexible substrate FS3 shown in the figure can be replaced with a single flexible substrate. According to the structural example, the leads for connection between the sensor SN and the second terminal portion T2 can be omitted, and a width between the display portion DA and the fourth edge E4 in the second direction Y can be made shorter.

According to the embodiments, as explained above, the sensor-equipped display device capable of making the frame narrower can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a first substrate comprising a first area, a second area adjacent to the first area, a first edge extending in a first direction, and a first terminal portion located in the first area; and
    a second substrate comprising a second edge including a linear portion facing the first substrate, the second substrate overlapping the second area of the first substrate, wherein
    the second substrate further comprises a protruding portion protruding more than the linear portion and a second terminal portion located in the protruding portion, the second edge has a curved portion connected to the linear portion and extends to the first edge, the protruding portion includes the curved portion, a width in the first direction of the protruding portion gradually decreases toward the first edge, and the display device further comprises a holding layer holding a gap between the second area and the protruding portion.

2. The display device of claim 1, further comprising an adhesive layer bonding the first substrate and the second substrate, wherein the adhesive layer is not interposed between the second area and the protruding portion, and the holding layer is spaced apart from the adhesive layer.

3. The display device of claim 1, further comprising:

a first flexible substrate comprising a first connection portion connected to the first terminal portion; and a second flexible substrate comprising a second connection portion connected to the second terminal portion.

4. The display device of claim 1, further comprising a single flexible substrate comprising a first connection portion connected to the first terminal portion and a second connection portion connected to the second terminal portion.

5. The display device of claim 1, wherein the first terminal portion and the second terminal portion are located in a row.

6. The display device of claim 1, wherein the display device comprises a first side edge and a second side edge opposed to the first side edge, a width between the first terminal portion and the first side edge is smaller than a width between the first terminal portion and the second side edge, and the protruding portion is located between the first terminal portion and the second side edge.

7. The display device of claim 1, wherein the display device comprises a first side edge and a second side edge opposed to the first side edge, and the first terminal portion is arranged symmetrically with respect to a center line between the first side edge and the second side edge.

8. The display device of claim 1, wherein the protruding portion overlaps a transparent portion, a light-shielding portion or a reflective portion.

9. The display device of claim 1, further comprising a sensor which overlaps the protruding portion.

10. The display device of claim 1, further comprising leads extending from the second terminal portion and inclined with respect to the curved portion.

11. The display device of claim 1, further comprising an adhesive layer bonding the first substrate and the second substrate, wherein the holding layer is the adhesive layer.

12. The display device of claim 11, further comprising a liquid crystal layer located between the first substrate and the second substrate and surrounded by the adhesive layer, wherein the liquid crystal layer is located between the second area and the protruding portion.

13. A display device comprising:

a first substrate comprising a first terminal portion and a first edge extending in a first direction;

a second substrate comprising a second terminal portion;

an overlap portion at which the first substrate and the second substrate overlap; and a non-overlap portion at which the first substrate and the second substrate do not overlap, wherein the overlap portion comprises a display portion and a frame portion, the second substrate further includes a second edge including a linear portion and a curved portion, and a protruding portion protruding more than the linear portion, the linear portion is located between the display portion and the first terminal portion, the curved portion is located between the first terminal portion and the second terminal portion, is connected to the linear portion, and extends to the first edge, the protruding portion includes the curved portion, a width in the first direction of the protruding portion gradually decreases toward the first edge, the first terminal portion is located in the non-overlap portion, and the second terminal portion is located in the frame portion.

14. The display device of claim 13, wherein the second terminal portion is located in the protruding portion.

15. The display device of claim 14, further comprising a holding layer holding a gap between the first substrate and the protruding portion.

16. The display device of claim 13, further comprising leads extending from the second terminal portion and inclined with respect to the curved portion.

* * * * *